United States Patent
Ibrahim et al.

(10) Patent No.: US 11,929,810 B2
(45) Date of Patent: Mar. 12, 2024

(54) PRECODER SELECTION IN INTEGRATED ACCESS AND BACKHAUL

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Wanshi Chen, San Diego, CA (US); Huilin Xu, Temecula, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/304,265

(22) Filed: Jun. 17, 2021

(65) Prior Publication Data

US 2022/0407578 A1 Dec. 22, 2022

(51) Int. Cl.
*H04B 7/06* (2006.01)
*H04B 7/0417* (2017.01)
(Continued)

(52) U.S. Cl.
CPC ......... *H04B 7/0639* (2013.01); *H04B 7/0417* (2013.01); *H04B 7/0456* (2013.01); *H04B 7/063* (2013.01); *H04W 88/14* (2013.01)

(58) Field of Classification Search
CPC .. H04B 7/0639; H04B 7/0417; H04B 7/0456; H04B 7/063; H04B 7/024; H04W 88/14
See application file for complete search history.

(56) References Cited

U.S. PATENT DOCUMENTS 11,350,409 B2 * 5/2022 Novlan ............ H04W 72/0446
2011/0077040 A1 * 3/2011 Nammi ............... H04L 5/0096
455/507

(Continued)

FOREIGN PATENT DOCUMENTS

WO WO-2020237628 A1 12/2020

OTHER PUBLICATIONS

Huawei et al., "Resource Multiplexing Between Backhaul and Access for IAB Duplexing Enhancements", 3GPP TSG RAN WG1 Meeting #102-e, R1-2005260, 3rd Generation Partnership Project, Mobile Competence Centre, 650, Route Des Lucioles, F-06921 Sophia-Antipolis Cedex, France, vol. RAN WG1, No. E-meeting, Aug. 17, 2020-Aug. 28, 2020 Aug. 8, 2020, XP051917308, 7 Pages, pp. 1-6.

(Continued)

*Primary Examiner* — Habte Mered
(74) *Attorney, Agent, or Firm* — Harrity & Harrity, LLP

(57) ABSTRACT

Various aspects of the present disclosure generally relate to wireless communication. In some aspects, a wireless node may transmit configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT. The wireless node may perform a communication in accordance with a selected PMI parameter of the first PMI parameter and the second PMI parameter based at least in part on whether the DU and the MT are simultaneously active. Numerous other aspects are described.

30 Claims, 16 Drawing Sheets

(51) Int. Cl.
H04B 7/0456 (2017.01)
H04W 88/14 (2009.01)

(56) References Cited

U.S. PATENT DOCUMENTS

2013/0279403 A1* 10/2013 Takaoka ............... H04L 5/0023
                                                        370/328
2021/0195541 A1*  6/2021 Wei .................... H04W 56/005
2023/0060168 A1*  3/2023 Sun .................... H04W 24/08

OTHER PUBLICATIONS

International Search Report and Written Opinion—PCT/US2022/072838—ISA/EPO—dated Sep. 26, 2022.
Moderator (AT&T): "Summary #2 of [103-e-NR-elAB-01]", 3GPP TSG RAN WG1 #103-e, R1-2009734, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020 Nov. 13, 2020, XP051954378, 43 Pages, pp. 1, 2.

* cited by examiner

PRECODER SELECTION IN INTEGRATED ACCESS AND BACKHAUL

FIELD OF THE DISCLOSURE

Aspects of the present disclosure generally relate to wireless communication and to techniques and apparatuses for precoder selection in integrated access and backhaul.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless node includes transmitting configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and performing a communication in accordance with a selected PMI parameter of the first PMI parameter and the second PMI parameter based at least in part on whether the DU and the MT are simultaneously active.

In some aspects, a method of wireless communication performed by an integrated access and backhaul (IAB) node includes receiving configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and performing a communication in accordance with a selected PMI parameter of the first PMI parameter and the second PMI parameter based at least in part on whether the DU and the MT are simultaneously active.

In some aspects, an apparatus for wireless communication at a wireless node includes a memory; and one or more processors, coupled to the memory, configured to: transmit configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and perform a communication in accordance with a selected PMI parameter of the first PMI parameter and the second PMI parameter based at least in part on whether the DU and the MT are simultaneously active.

In some aspects, an apparatus for wireless communication at an integrated access and backhaul (IAB) node includes a memory; and one or more processors, coupled to the memory, configured to: receive configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and perform a communication in accordance with a selected PMI parameter of the first PMI parameter and the second PMI parameter based at least in part on whether the DU and the MT are simultaneously active.

In some aspects, a non-transitory computer-readable medium storing a set of instructions for wireless communication includes one or more instructions that, when executed by one or more processors of a wireless node, cause the wireless node to: transmit configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and perform a communication in accordance with a selected PMI parameter of the first PMI parameter and the second PMI parameter based at least in part on whether the DU and the MT are simultaneously active.

In some aspects, a non-transitory computer-readable medium storing a set of instructions for wireless communication includes one or more instructions that, when executed by one or more processors of an integrated access and backhaul (IAB) node, cause the IAB to: receive configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and perform a communication in accordance with a selected PMI parameter of the first PMI parameter and the second PMI parameter based at least in part on whether the DU and the MT are simultaneously active.

In some aspects, an apparatus for wireless communication includes means for transmitting configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and means for performing a communication in accordance with a selected PMI parameter of the first PMI parameter and the second PMI parameter based at least in part on whether the DU and the MT are simultaneously active.

In some aspects, an apparatus for wireless communication includes means for receiving configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and means for performing a communication in accordance with a selected PMI parameter of the first PMI parameter and the second PMI parameter based at least in part on whether the DU and the MT are simultaneously active.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
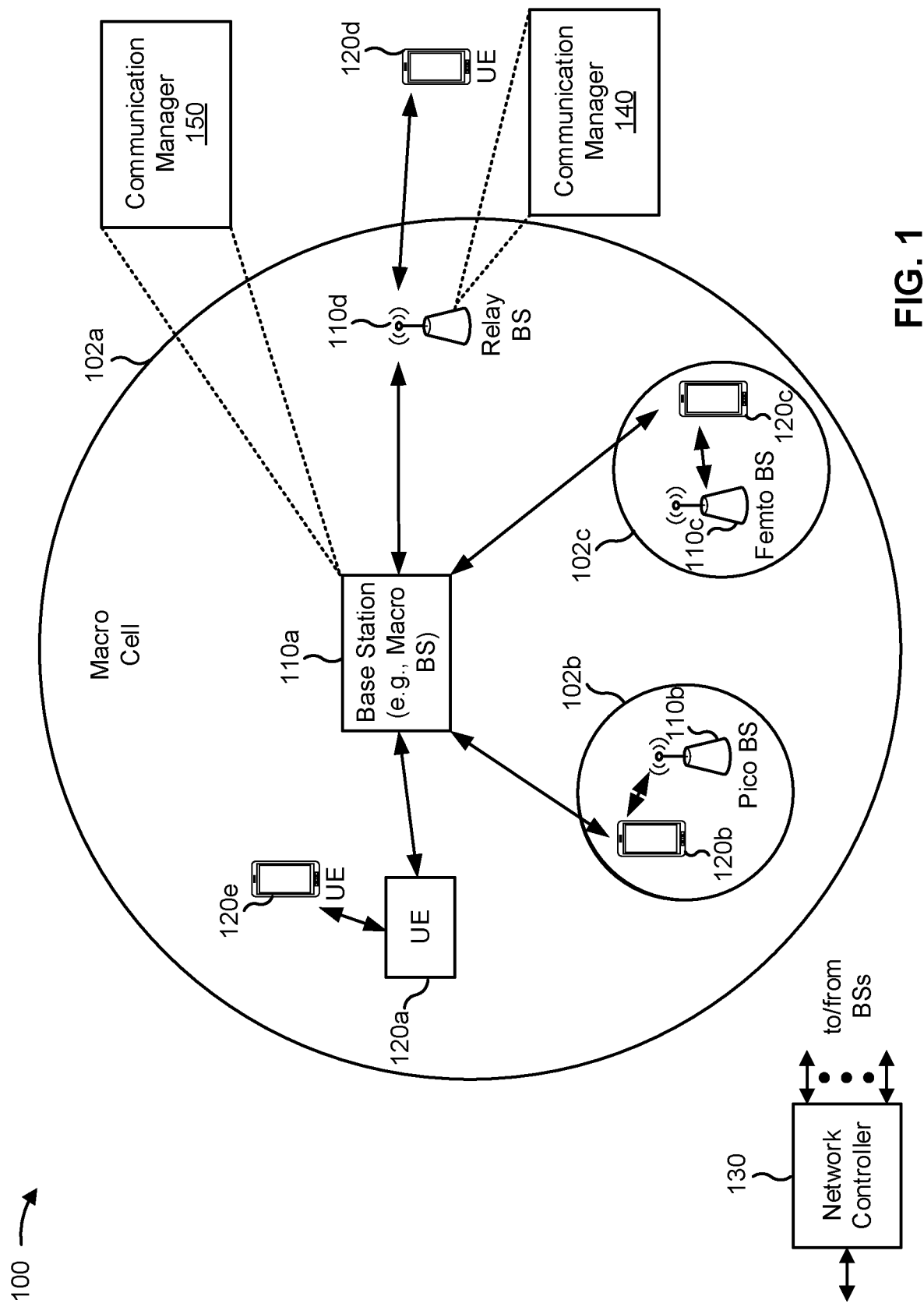
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the base station 110 may include a communication manager 140. As described in more detail elsewhere herein, the communication manager 140 may receive configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is associated with simultaneous activity of the DU and the MT; and perform a communication in accordance with a selected PMI parameter of the first PMI parameter and the second PMI parameter based at least in part on whether the DU and the MT are simultaneously active. Additionally, or alternatively, the communication manager 150 may perform one or more other operations described herein.

In some aspects, a base station 110 may include a communication manager 150. As described in more detail elsewhere herein, the communication manager 150 may transmit configuration information indicating a first PMI parameter and a second PMI parameter. The first PMI parameter may be associated with non-simultaneous activity of a DU and an MT. The second PMI parameter may be associated with simultaneous activity of the DU and the MT. The base station 110 may perform a communication in accordance with a selected PMI parameter of the first PMI parameter and the second PMI parameter based at least in part on whether the DU and the MT are simultaneously active. Additionally, or alternatively, the communication manager 150 may perform one or more other operations described herein.

As indicated above, FIG. 1 is provided as an example. Other examples may differ from what is described with regard to FIG. 1.

Figure 2:
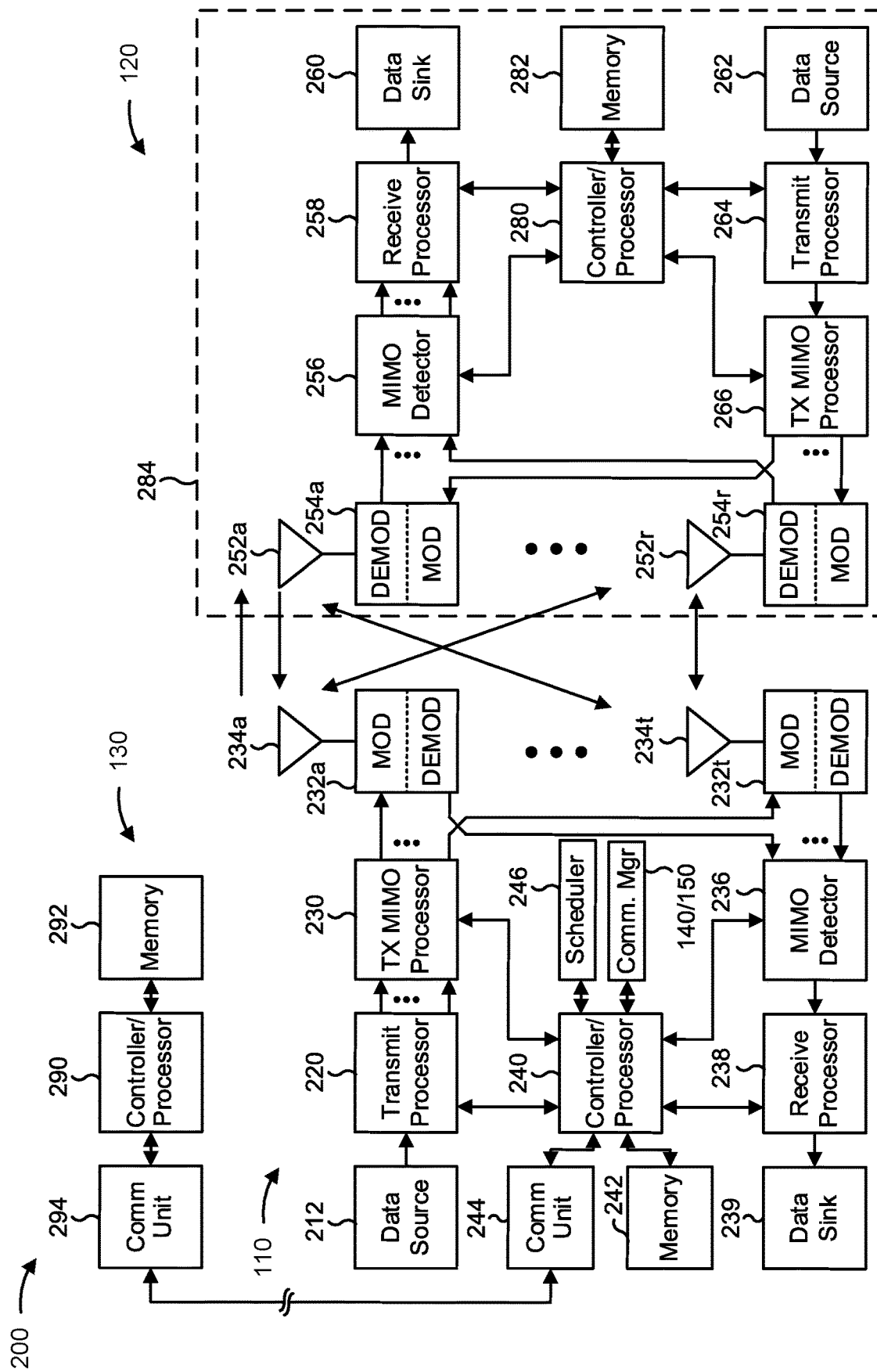
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-14).

Controller/processor 240 of base station 110, controller/processor 280 of UE 120, and/or any other component(s) of FIG. 2 may perform one or more techniques associated with precoder selection for integrated access and backhaul (IAB), as described in more detail elsewhere herein. In some aspects, the IAB node described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, the wireless node includes means for transmitting configuration information indicating a first PMI parameter and a second PMI parameter, wherein the first PMI parameter is associated with non-simultaneous activity of a DU and an MT, and wherein the second PMI parameter is associated with simultaneous activity of the DU and the MT; and/or means for performing a communication in accordance with a selected PMI parameter of the first PMI parameter and the second PMI parameter based at least in part on whether the DU and the MT are simultaneously active. In some aspects, the means for the wireless node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the IAB node includes means for receiving configuration information indicating a first PMI parameter and a second PMI parameter, wherein the first PMI parameter is associated with non-simultaneous activity of a DU and an MT, and wherein the second PMI parameter is associated with simultaneous activity of the DU and the MT; and/or means for performing a communication in accordance with a selected PMI parameter of the first PMI parameter and the second PMI parameter based at least in part on whether the DU and the MT are simultaneously active. In some aspects, the means for the IAB node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
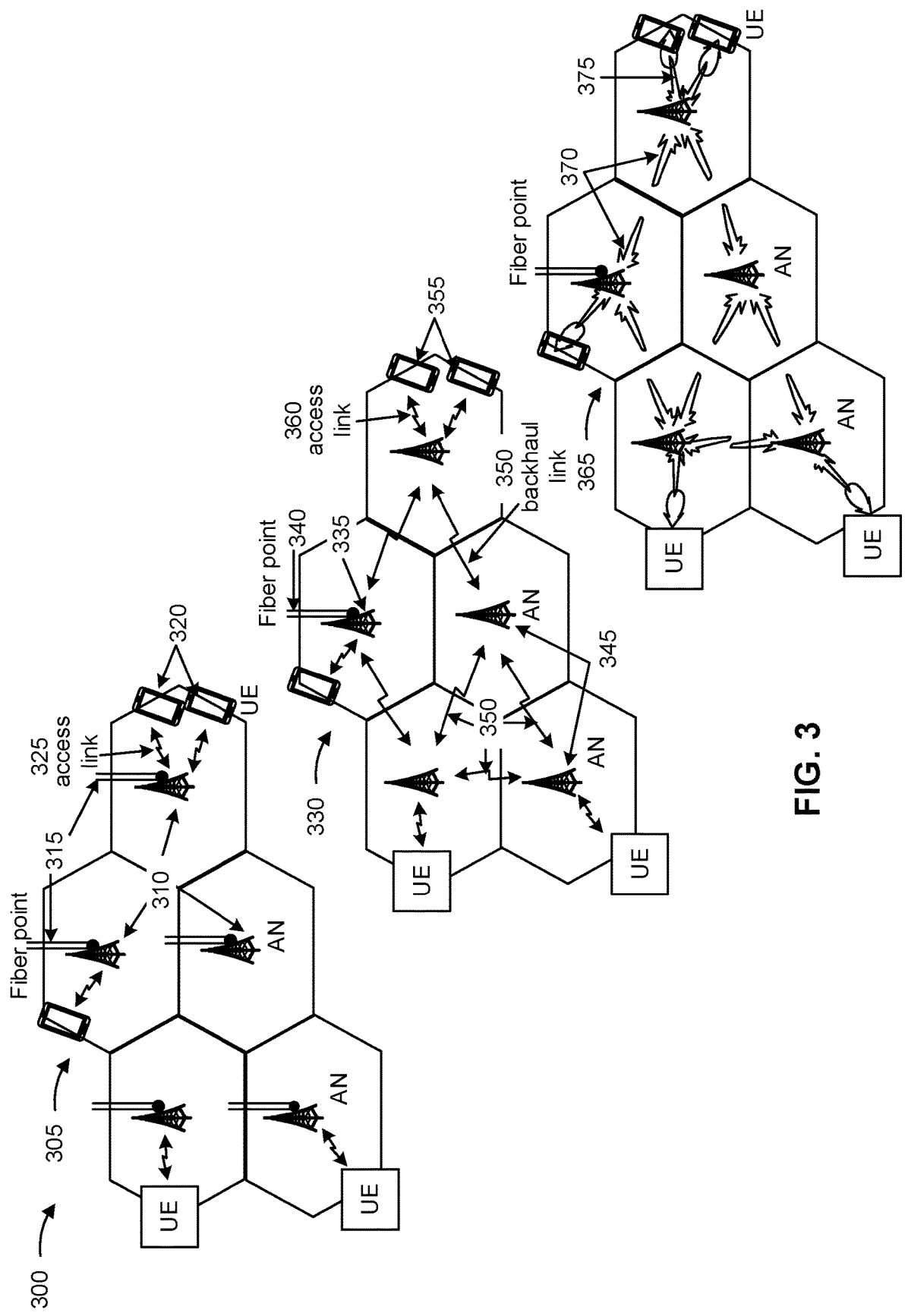
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. An IAB network may use wireless relaying to significantly reduce the need for fiber (e.g., wireline) connections. An IAB network may leverage high spectral efficiency due to inter-link interference suppression. An IAB network may exploit high gain beams (e.g., using beamforming) on both link endpoints for backhaul links.

In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

Some techniques and apparatuses described herein provide for selection of a precoder for a beam, such as a precoder matrix indicator (PMI) or a transmit PMI (TPMI) based at least in part on whether or not an IAB node is associated with a simultaneously active distributed unit and mobile termination, such as to reduce inter-link interference. As indicated above, FIG. 3 is provided as an example. Other examples may differ from what is described with regard to FIG. 3.

Figure 4:
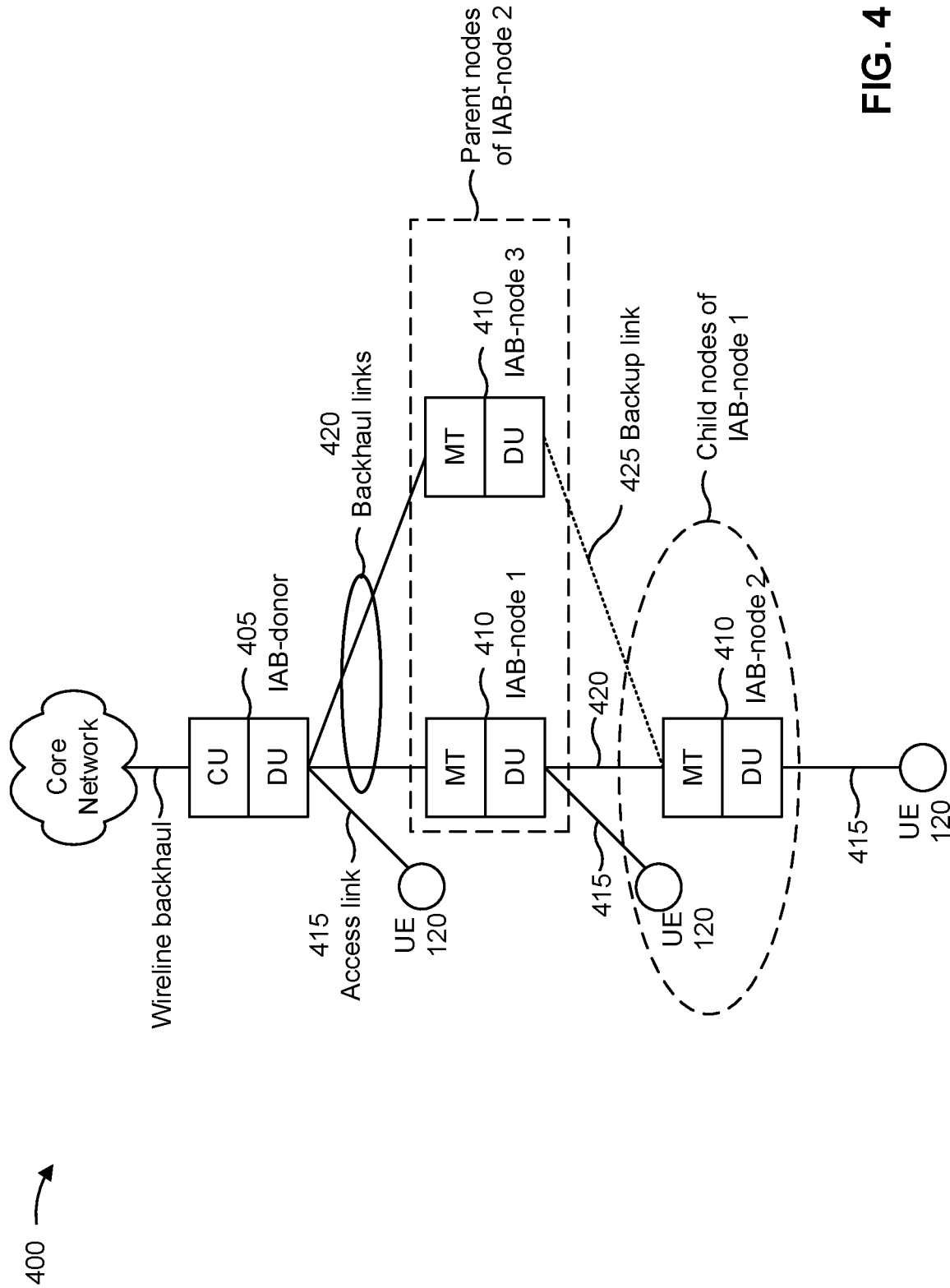
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node or child IAB node) may be controlled and/or scheduled by another IAB node 410 (e.g., a parent node or parent IAB node of the child node) and/or by an IAB donor 405. The DU functions of an IAB node 410 (e.g., a parent node) may control and/or schedule other IAB nodes 410 (e.g., child nodes of the parent node) and/or UEs 120. Additionally, or alternatively, the DU functions of an IAB node 410 may configure PMI subset restrictions and/or select TPMI precoders for other IAB nodes 410 and/or UEs 120, as described in more detail elsewhere herein. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

In some cases, an IAB network may utilize full duplex communications. "Full duplex communications" refers to communications using overlapped resources (e.g., time, frequency, and/or spatial resources). One type of full duplex communication is in-band full duplex (IBFD). In IBFD, a wireless node may transmit and receive on the same time and frequency (time/frequency) resource. The downlink and the uplink in IBFD may share the same time/frequency resource (with full overlap or with partial overlap). Another type of full duplex communication is sub-band frequency division duplexing (FDD) (also known as "flexible duplex"). In sub-band FDD, a wireless node may transmit and receive at the same time on different frequency resources. In some implementations, frequency resources for transmission may be separated from frequency resources for reception by a guard band.

A DU and an MT of an IAB donor 405 or IAB node 410 may be simultaneously active, meaning that both of the DU and the MT are performing a transmission or a reception at a given time. Interference may arise in such a situation, depending on which of the DU and the MT is transmitting and which is receiving. Various examples are provided elsewhere herein. Techniques and apparatuses described herein provide for PMI subset restriction and/or TPMI precoder selection to mitigate and/or eliminate interference associated with a DU and an MT of an IAB node, such as by barring selection of a PMI or TPMI corresponding to a beam that causes such interference.

As indicated above, FIG. 4 is provided as an example. Other examples may differ from what is described with regard to FIG. 4.

Figure 5:
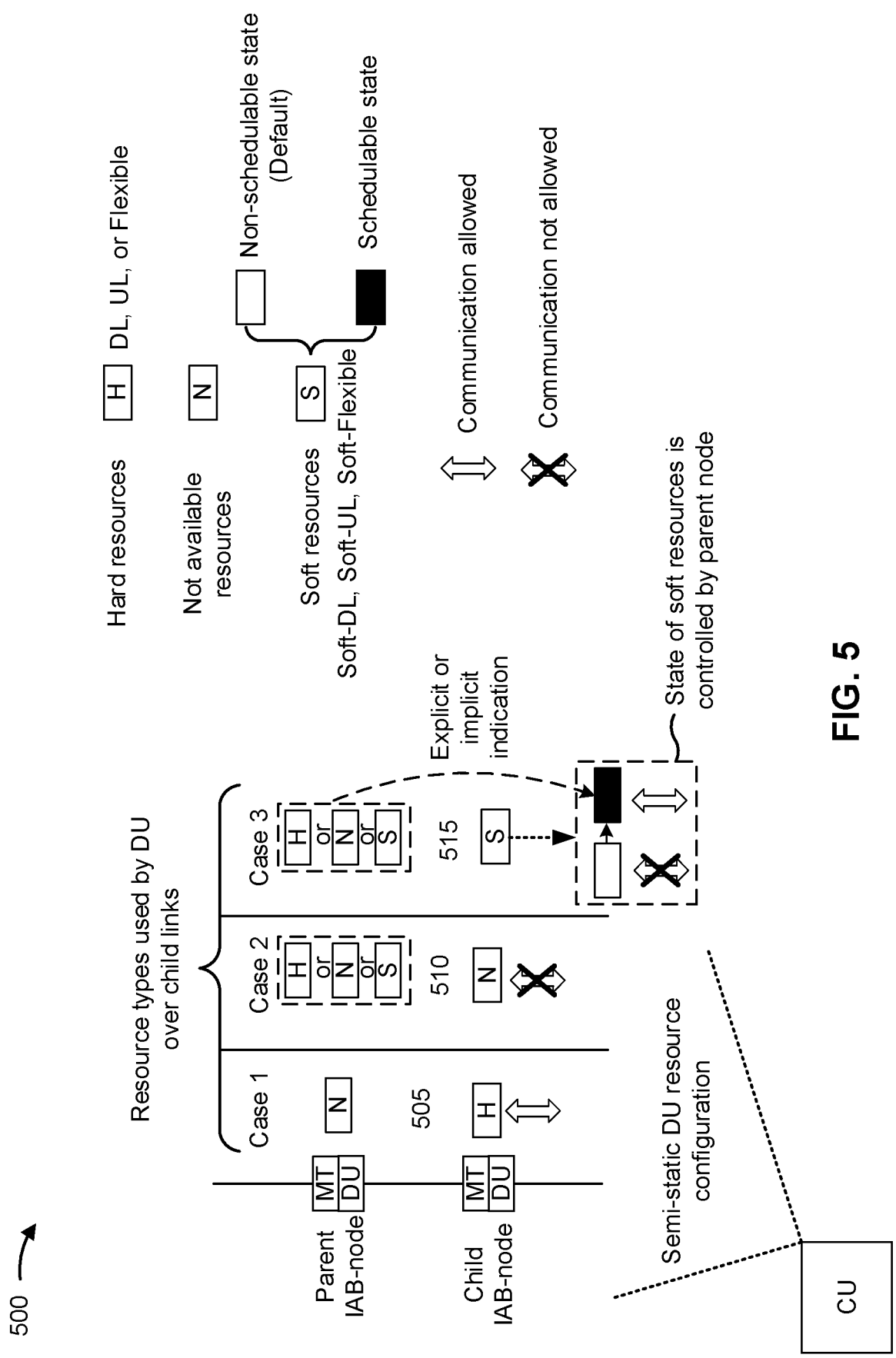
FIG. 5 is a diagram illustrating an example of resource types in an IAB network, in accordance with the present disclosure.

FIG. 5 is a diagram illustrating an example 500 of resource types in an IAB network, in accordance with the present disclosure. Generally, resources in an IAB network can be semi-statically configured. For example, a CU may semi-statically configure a resource configuration for a DU. The resource configuration may indicate whether resources are downlink-only, uplink-only, flexible, hard, soft, and/or not available for the DU, as described in more detail below. DUs may communicate with each other and with MTs to perform resource management of the configured resources. For example, a DU may provide an indication of whether a soft resource is released for another wireless node. Example 500 primarily illustrates time resources. However, the techniques described with regard to example 500 can also be applied for configuration and management of frequency resources, as described below.

In an IAB network, resources (such as time resources and frequency resources) may be configured as downlink-only, uplink-only, flexible, or not available (e.g., unavailable). When a resource is configured as downlink-only for a wireless node, that resource may be available for only downlink communications of the wireless node, and not uplink communications. Similarly, when a resource is configured as uplink-only for a wireless node, that resource may be available for only uplink communications of the wireless node, and not downlink communications. When a resource is configured as flexible for a wireless node, that resource may be available for both downlink communications and uplink communications of the wireless node. When a resource is configured as not available for a wireless node, that resource may not be used for any communications of the wireless node.

Examples of downlink communications include synchronization signal blocks (SSBs), channel state information reference signals (CSI-RS), physical downlink control channel (PDCCH) communications, and physical downlink shared channel (PDSCH) communications. Examples of uplink communications include physical random access channel (PRACH) communications, physical uplink control channel (PUCCH) communications, physical uplink shared channel (PUSCH) communications, and sounding reference signals (SRSs).

Resources in an IAB network that are configured as downlink-only, uplink-only, or flexible may be further configured as hard resources or soft resources. When a resource is configured as a hard resource for a wireless node, that resource is always available for communications of the wireless node. For example, a hard downlink-only resource is always available for only downlink communications of the wireless node, a hard uplink-only resource is always available for only uplink communications of the wireless node, and a hard flexible resource is always available for uplink and downlink communications of the wireless node.

When a resource is configured as a soft resource for a wireless node, the availability of that resource is controlled by a parent node of the wireless node. For example, the parent node (e.g., a DU of the parent node) may indicate (e.g., explicitly or implicitly) whether a soft resource is available for communications of the wireless node. Thus, a soft resource may be in one of two states: a schedulable state (e.g., when the soft resource is available for scheduling and/or communications of the wireless node) and a nonschedulable state (e.g., when the soft resource is not available for scheduling and is not available for communications of the wireless node).

For example, a soft downlink-only resource is only available for downlink communications of the wireless node when a parent node of the wireless node indicates that the soft downlink-only resource is available. Similarly, a soft uplink-only resource is only available for uplink communications of the wireless node when a parent node of the wireless node indicates that the soft uplink-only resource is available. A soft flexible resource is only available for uplink and downlink communications of the wireless node when a parent node of the wireless node indicates that the soft flexible resource is available.

As an example, and as shown by reference number 505, a resource may be configured as hard for a child node, and may be configured as not available for a parent node of the child node. In this case, the parent node cannot communicate using that resource, but the child node can schedule communications in that resource and/or communicate using that resource. This configuration may reduce interference between the parent node and the child node and/or may reduce scheduling conflicts between the parent node and the child node.

As another example, and as shown by reference number 510, a resource may be configured as not available for the child node, and may be configured as hard, soft, or not available for the parent node (e.g., depending on a network configuration, network conditions, and/or a configuration of a parent node of the parent node). In this case, the child node cannot schedule communications in that resource and cannot communicate using that resource.

As another example, and as shown by reference number 515, a resource may be configured as soft for the child node, and may be configured as hard, soft, or not available for the parent node (e.g., depending on a network configuration, network conditions, and/or a configuration of a parent node of the parent node). In this case, the child node cannot schedule or communicate using the resource unless the child node receives an indication (e.g., a release indication), from the parent node (e.g., explicitly or implicitly), that the resource is available (i.e., released) for use by the child node. If the child node receives such an indication, then the child node can schedule communications in that resource and/or communicate using that resource.

In some aspects, described elsewhere herein, a resource configuration may be associated with a PMI subset restriction or a TPMI precoder. For example, the resource configuration may indicate a particular PMI subset restriction or a particular TPMI precoder to be used for a given resource.

As indicated above, FIG. 5 is provided as an example. Other examples are possible and may differ from what was described with regard to FIG. 5.

Figure 6:
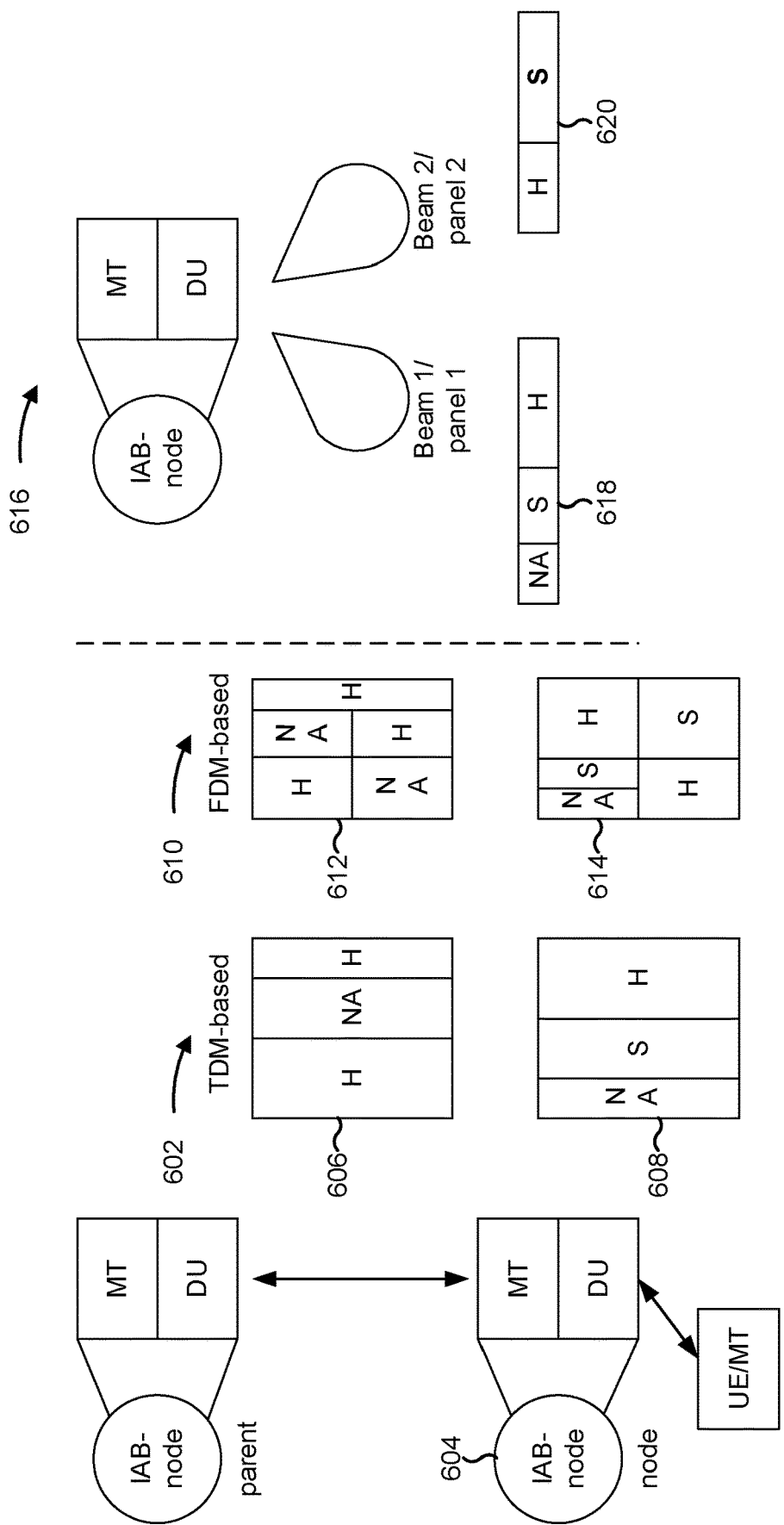
FIG. 6 is a diagram illustrating examples of time, frequency, and spatial division multiplexed IAB resource configurations, in accordance with the present disclosure.

FIG. 6 is a diagram illustrating examples of time, frequency, and spatial division multiplexed IAB resource configurations, in accordance with the present disclosure. Time division multiplexing (TDM) may facilitate half-duplex operation of an MT and a DU of an IAB node. For example, if MT resources and DU resources are time division multiplexed (TDMed), only one of the MT and the DU is active (e.g., transmitting or receiving) at a given time. An example of TDM IAB resources is shown by reference number 602 for an IAB node 604. The resources shown by reference number 606 are configured for the MT of the IAB node 604 and correspond to the link between the DU of the parent IAB-node and the MT of the IAB node 604, and the resources shown by reference number 608 are configured for the DU of the IAB node 604 and correspond to the link between the DU of the IAB-node 604 and the UE (or MT) shown below the IAB node 604. The horizontal dimension represents time.

Frequency division multiplexing (FDM) and spatial division multiplexing (SDM) of IAB resources may facilitate simultaneous operation of an MT and a DU of an IAB node. An example of FDMed IAB resources is shown by reference number 610. In this example, the resource configuration includes two sub-bands (e.g., two resource block (RB) groups). The horizontal dimension represents time and the vertical dimension represents frequency. The resources shown by reference number 612 are configured for the MT of the IAB node 604 and correspond to the link between the DU of the parent IAB node and the MT of the IAB node 604, and the resources shown by reference number 614 are configured for the DU of the IAB node 604 and correspond to the link between the DU of the IAB node 604 and the UE (or MT) shown below the IAB node 604. The usage of the two sub-bands enables simultaneous communication by the MT of the IAB node 604 and the DU of the IAB node 604, because the MT can utilize resources on one of the sub-bands and the DU can utilize resources on the other of the sub-bands at the same time.

An example of SDMed IAB resources is shown by reference number 616. In this example, a first beam, transmitted by a first panel, is associated with a first resource configuration 618. A second beam, transmitted by a second panel, is associated with a second resource configuration 620. The usage of the two beams and/or the two panels enables simultaneous communication by the MT of the IAB node 604 and the DU of the IAB node 604, since the MT can use one of the beams/panels and the DU can use the other of the beams/panels.

As indicated above, FIG. 6 is provided as an example. Other examples may differ from what is described with regard to FIG. 6.

Figure 7:
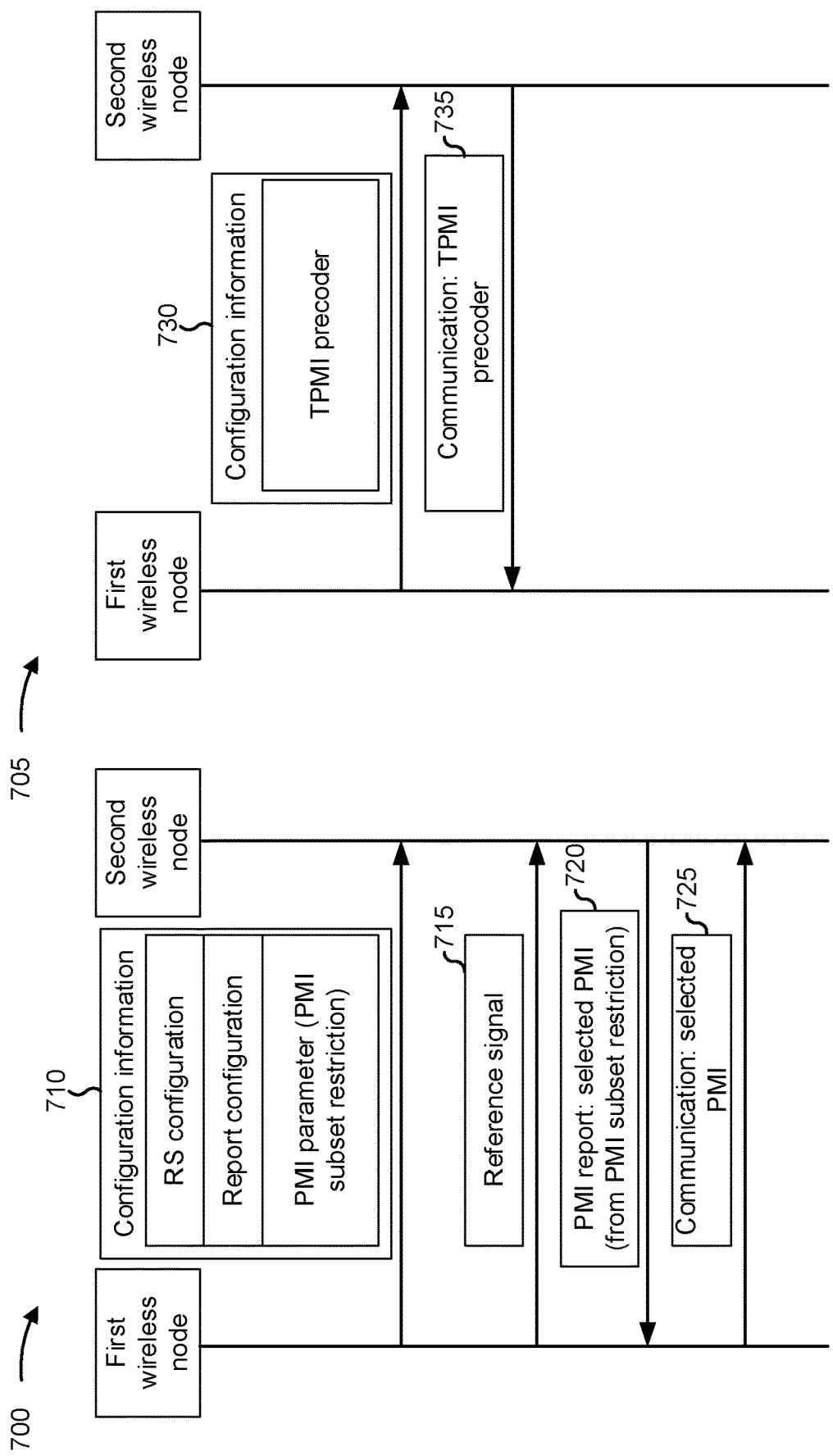
FIG. 7 is a diagram illustrating an example of signaling associated with configuring and reporting a precoding matrix indicator (PMI), in accordance with the present disclosure.

FIG. 7 is a diagram illustrating examples 700 and 705 of signaling associated with configuring and reporting a precoding matrix indicator (PMI) and a transmit PMI (TPMI), in accordance with the present disclosure.

Examples 700 and 705 include a first wireless node and a second wireless node. The first wireless node may include, for example, BS 110, anchor base station 335, non-anchor base station 345, IAB-donor 405 (e.g., a CU of IAB-donor 405 or a DU of IAB-donor 405), IAB-node 410 (e.g., a DU of IAB-node 410), or the like. The second wireless node may include, for example, BS 110, non-anchor base station 345, IAB-node 410 (e.g., a DU of IAB-node 410), or the like.

Example 700 is an example of indication of a selected PMI. A PMI allows the second wireless node to report a preferred precoding for downlink transmissions to the second wireless node via the physical downlink shared channel (PDSCH). As shown by reference number 710, the first wireless node (e.g., a CU or DU of the first wireless node) may provide configuration information to the second wireless node, such as via radio resource control (RRC) signaling. The configuration information may include a reference signal (RS) configuration and a report configuration. In some aspects, the RS configuration may be a channel state information (CSI) RS (CSI-RS) configuration, though other forms of RSs may be used for the techniques described herein. The RS configuration may identify a type of the RS, a resource associated with the RS, a format associated with the RS, one or more parameters associated with the RS, or the like. The report configuration may identify a configuration for reporting information about received RSs. For example, the report configuration may identify a threshold for reporting an RS, information to report in association with an RS, a resource for reporting an RS, or the like.

As further shown, the configuration information may include a PMI parameter. In example 700, the PMI parameter is a PMI subset restriction. In some aspects, the PMI parameter may be included in a configuration element such as CodebookConfig. The configuration information regarding the PMI parameter may identify, for example, a codebook type, a number of antenna ports, a codebook mode, or the like. As mentioned above, the PMI parameter of example 700 is a PMI subset restriction. A PMI subset restriction may identify a subset of possible PMIs from which the second wireless node must select one or more PMIs for reporting. Equivalently, a PMI subset restriction may identify a set of PMIs that cannot be selected for reporting. Thus, a PMI subset restriction may disallow certain PMIs from being selected by the second wireless node, which can be used to limit the set of beams available for selection by the second wireless node. Techniques and apparatuses described herein employ PMI subset restrictions to reduce interference associated with simultaneous MT and DU communication by an IAB node by disallowing selection of downlink beams associated with the interference.

As shown by reference number 715, the first wireless node may transmit a reference signal to the second wireless node. For example, the first wireless node may transmit a reference signal of the type configured by the RS configuration. The first wireless node may transmit the reference signal on a number of beams (associated with respective PMIs) such that the second wireless node can select a suitable beam (associated with a corresponding PMI) for the first wireless node to use for subsequent downlink communications.

As shown by reference number 720, the second wireless node may transmit a PMI report. For example, the second wireless node may select a PMI based at least in part on a reference signal transmitted via a beam associated with the PMI being associated with a suitable measurement (e.g., a best measurement, a measurement that satisfies a threshold, etc.). The second wireless node may select the PMI in accordance with the PMI subset restriction. For example, the second wireless node may select a PMI from only those PMIs included in the PMI subset restriction. The PMI report may be included in, for example, a CSI-RS report configured by the report configuration.

As shown by reference number 725, the first wireless node may transmit a communication using the selected PMI. For example, the first wireless node may precode a PDSCH of the PMI in accordance with a codebook specified by the configuration information and using a precoder corresponding to the PMI. Thus, the second wireless node may indicate a preferred beam by way of the selected PMI, and the first wireless node may use the preferred beam for communication with the second wireless node.

Example 705 is an example of configuration of a TPMI. A TPMI indicates a precoder for an uplink transmission from the second wireless node to the first wireless node. "TPMI precoder," as used herein, can refer to a TPMI or to a corresponding precoder. As shown by reference number 730, the first wireless node may provide configuration information to the second wireless node. The configuration information may indicate a TPMI. The configuration information of example 705 may be transmitted via RRC signaling, medium access control signaling, downlink control information, or a combination thereof. In some aspects, the first wireless node may select the TPMI. For example, the first wireless node may select the TPMI based at least in part on an indication from the second wireless node. The indication may indicate a preferred TPMI and/or a non-preferred TPMI. Techniques and apparatuses described herein employ TPMI selection or restriction to reduce interference associated with simultaneous MT and DU communication by an IAB node by disallowing selection of uplink beams associated with the interference. As shown by reference number 735, the second wireless node may transmit a communication using a precoder indicated by the TPMI.

As indicated above, FIG. 7 is provided as an example. Other examples may differ from what is described with regard to FIG. 7.

Full-duplex communication between wireless nodes may be in-band full duplex (IBFD) and/or sub-band frequency-division full-duplex (FDD). For IBFD, a wireless node may transmit and receive data on the same time and frequency resource. The IBFD uplink resources for the wireless node may fully or partially overlap, in time and/or frequency, with the IBFD downlink resources for the wireless node. For sub-band FDD, a wireless node may transmit and receive data at the same time but on different frequency resources. Typically, the downlink resource is separated from the uplink resource in the frequency domain.

In some cases, an IAB node may be constrained to half-duplex communication. For example, self-interference may prevent simultaneous operation of communication with children IAB nodes via a downstream link (e.g., DU communication) and communication with a parent IAB node via an upstream link (e.g., MT communication). For example, when the DU and the MT of the wireless node are active at the same time, transmission from one panel (e.g., the DU) may cause interference to reception at the other panel (e.g., the MT) based at least in part on main and/or side lobes of an antenna pattern associated with the DU communication and/or the MT communication. Simultaneous MT communication and DU communication at an IAB node, such as by FDM or SDM of MT communications and DU communications, may significantly increase the data rate of the IAB network. Without actions to mitigate the above-described interference, simultaneous MT communication and DU communication may be impractical or impossible. For example, beamformed communications of the MT may interfere with beamformed communications of the DU, or vice versa. This interference may cause degraded performance, diminished throughput, inefficient usage of resources, and potentially failure to successfully implement full-duplex communication.

Some aspects described herein relate to enhancing PMI and/or TPMI selection and configuration to enable simultaneous MT communication and DU communication at a wireless node (e.g., an IAB node). In some aspects, the wireless node may utilize a PMI subset restriction to enable simultaneous MT communication and DU communication at a wireless node. For example, DU communications received from a child wireless node may interfere with MT communications received from a parent wireless node. The parent wireless node may configure the wireless node with a first PMI parameter and a second PMI parameter. The first PMI parameter may allow one or more PMI precoders that are associated with the interference at the DU and/or the MT while in simultaneous DU/MT operation. The second PMI parameter may be associated with simultaneous activity of the DU and the MT and may disallow the one or more PMI precoders that are associated with the interference at the DU and/or the MT while in simultaneous DU/MT operation. In this way, the wireless node may enable simultaneous MT communication and DU communication at the wireless node which may lead to improved network efficiency. Techniques and apparatuses described herein provide for selection of TPMI precoder to reduce interference. For example, a first TPMI precoder and a second TPMI precoder may be configured, where the first TPMI precoder is associated with non-simultaneous DU/MT operation and the second TPMI precoder is associated with simultaneous DU/MT operation. The second TPMI precoder may correspond to a beam that is not associated with interference during simultaneous DU/MT operation.

Figure 8:
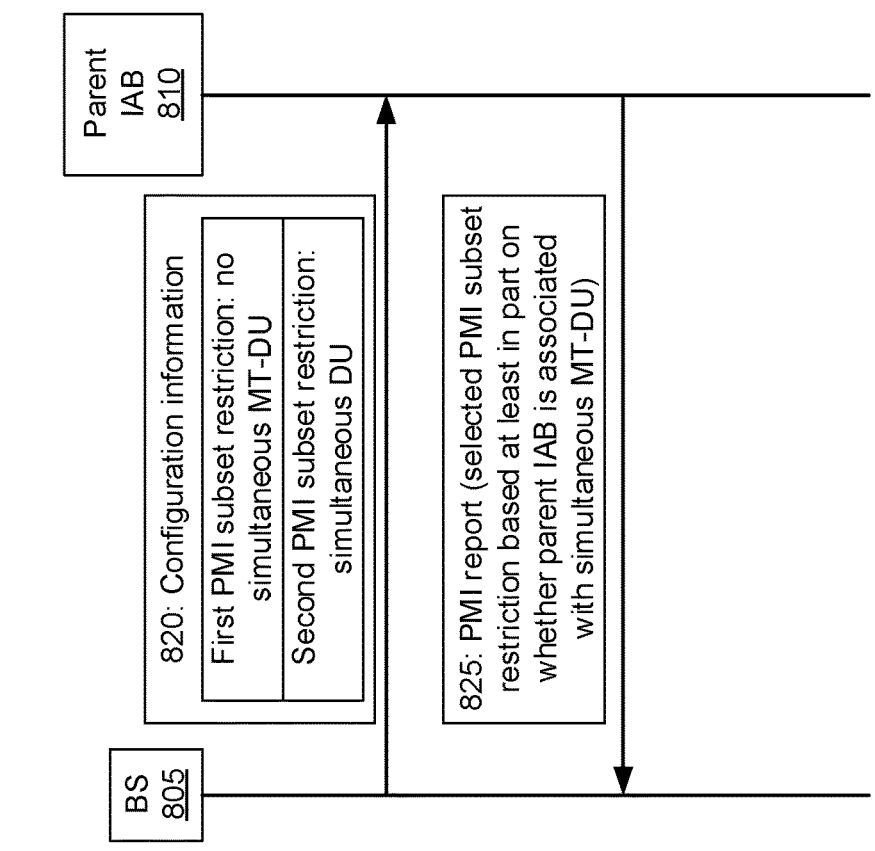
FIG. 8 is a diagram illustrating an example of PMI subset restriction based at least in part on interference, in accordance with the present disclosure.
Figure 8:
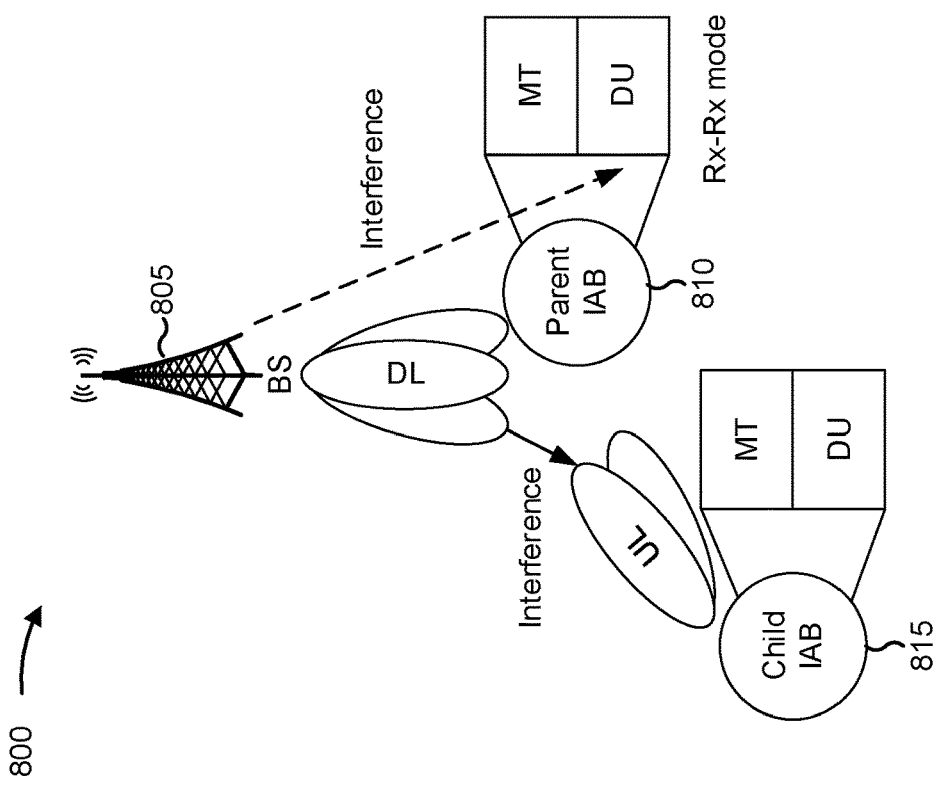

FIG. 8 is a diagram illustrating an example 800 of PMI subset restriction based at least in part on interference, in accordance with the present disclosure. As shown in FIG. 8, a base station 805 (e.g., which may include at least one of base station 110, anchor base station 335, non-anchor base station 345, IAB-donor 405, IAB-node 410, a DU of one of the aforementioned nodes), a parent IAB node 810 (e.g., which may include at least one of base station 110, non-anchor base station 345, IAB-node 410, and which may include an MT and a DU), and a child IAB node 815 (e.g., which may include base station 110, UE 120, non-anchor base station 345, IAB-node 410, and which may include an MT and a DU) communicate via an IAB network.

In some aspects, interference may prevent simultaneous activity of a DU and an MT by the parent IAB node 810. For example, as shown in FIG. 8, an uplink transmission received by a DU of the parent IAB node 810 from an MT of the child IAB node 815 may be subject to interference from a downlink transmission received by the MT of the parent IAB node 810 from the base station 805. Thus, the parent IAB node 810 is illustrated as being in a receive-receive (Rx-Rx) mode.

To enable simultaneous activity of the DU and the MT at the parent IAB node 810, the base station 805 may configure the parent IAB node 810 with one or more PMI subset restrictions. For example, one or more beam-pairs may be subject to higher interference between the BS 805 and the parent IAB 810 relative to other beam-pairs. As described herein, the base station 805 may configure the parent IAB node 810 to utilize one or more precoders which may associated with the one or more beam-pairs during non-simultaneous activity of the DU and the MT and to utilize one or more precoders which exclude the one or more beam-pairs when both the DU and the MT are active. As used herein, a DU or an MT being "active" may mean that the DU or the MT is associated with an ongoing data session, is associated with an ongoing transmission, is associated with a hard resource at a given time or frequency, or the like.

As shown by reference number 820, the base station 805 may provide configuration information to the parent IAB node 810. The configuration information may indicate one or more PMI parameters. For example, as shown in FIG. 8, the configuration information may indicate a first PMI parameter and a second PMI parameter.

In some aspects, the first PMI parameter may be associated with non-simultaneous activity of the DU and the MT of the parent IAB node 810. In some aspects, the first PMI parameter may be a first PMI subset restriction that allows one or more PMIs corresponding to one or more precoders that are associated with the interference at the DU. In some aspects, the second PMI parameter may be associated with simultaneous activity of the DU and the MT at the parent IAB node 810. In some aspects, the second PMI parameter is a second PMI subset restriction that disallows the one or more PMIs corresponding to one or more precoders that are associated with the interference at the DU. Thus, the parent IAB node 810 may be barred from reporting the one or more PMIs that cause interference at the DU, which reduces interference associated with full-duplex operation of the parent IAB node 810.

In some aspects, the configuration information includes a bitmap that indicates activation or deactivation of the first PMI subset restriction and/or the second PMI subset restriction. The bitmap may have a plurality of bits corresponding to a plurality of resources, such as time resources or frequency resources. A bit corresponding to a given resource and having a first value may indicate that the first PMI subset restriction should be used for the given resource. A bit corresponding to a given resource and having a second value may indicate that the second PMI subset restriction should be used for the given resource. In some aspects, for a TDM resource allocation, the bitmap may be defined based at least in part on resource sharing between the MT and the DU at the IAB node 810. For example, if a resource is shared between the MT and the DU at the IAB node 810 (such as for full duplex communication), the bitmap may indicate that the second PMI subset restriction should be used for the resource. Thus, the second PMI subset restriction can be used in slots when IAB simultaneous operation is active.

In some aspects, the base station 805 may update the bitmap and may transmit the updated bit map to the parent IAB node 810. For example, the base station 805 may update the bit map based at least in part on transmitting a resource release (such as downlink control information of Format 2_5, which indicates release of resources) to the parent IAB node 810. Additionally, or alternatively, the parent IAB node 810 may update the bitmap. For example, the parent IAB node may receive a resource release, and may update the bitmap accordingly (for example, by dropping a portion of the bitmap associated with a released resource).

In some aspects, the configuration information includes three or more PMI parameters. For example, the configuration information may indicate three or more different PMI subset restrictions. In some aspects, the configuration information may include three or more PMI parameters associated with different frequency configurations of resources configured for the parent IAB node 810. For example, the three or more PMI parameters may be associated with different configurations of overlapping frequency resources, separated frequency resources, or the like. More particularly, separated frequency resources may be associated with a less stringent PMI subset restriction than overlapping frequency resources, since separated frequency resources are less likely to experience interference during full-duplex operation.

As shown by reference number 825, the parent IAB node 810 may provide a PMI report to the base station 805. In some aspects, the parent IAB node 810 may provide the PMI report using a PMI subset restriction of a selected PMI parameter (e.g., the first PMI parameter or the second PMI parameter). For example, the parent IAB node 810 may determine whether both the DU and the MT are currently active.

The parent IAB node 810 may transmit the PMI report using the first PMI subset restriction when the DU and the MT are not both currently active. The parent IAB node 810 may transmit the PMI report using the second PMI subset restriction that does not allow PMIS associated with one or more precoders that are associated with the interference at the DU when both the DU and the MT are currently active. The PMI report may indicate the selected PMI subset restriction based at least in part on whether the parent IAB node 810 is associated with simultaneous activity on the DU and the MT.

In some aspects, the base station 805 may receive the PMI report. The base station 805 may communicate with the parent IAB node 810 using a precoder indicated by the PMI report. Thus, the base station 805 may communicate with the parent IAB node 810 in accordance with the selected PMI parameter.

As indicated above, FIG. 8 is provided as an example. Other examples may differ from what is described with regard to FIG. 8.

Figure 9:
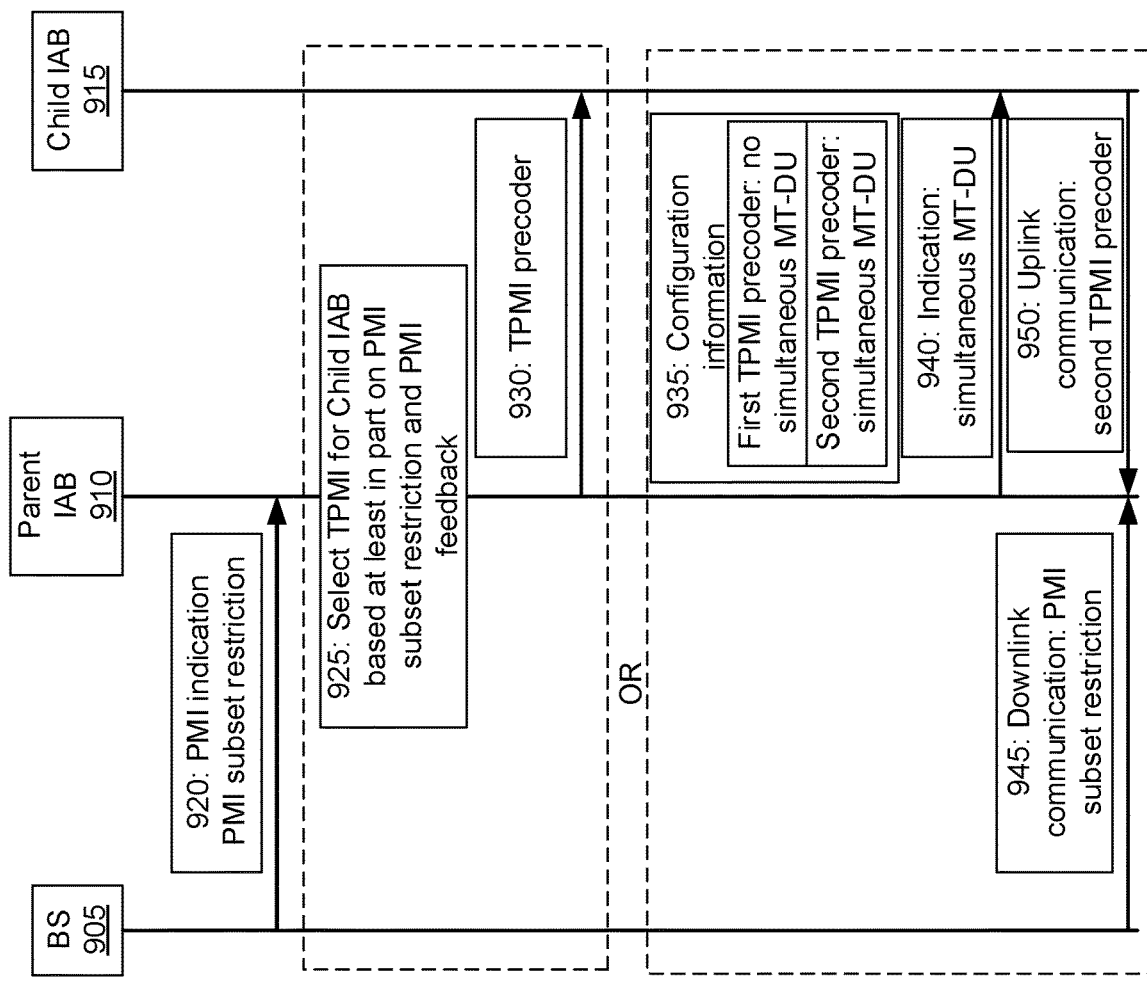
FIG. 9 is a diagram illustrating an example of transmit PMI (TPMI) precoder configuration based at least in part on interference, in accordance with the present disclosure.
Figure 9:
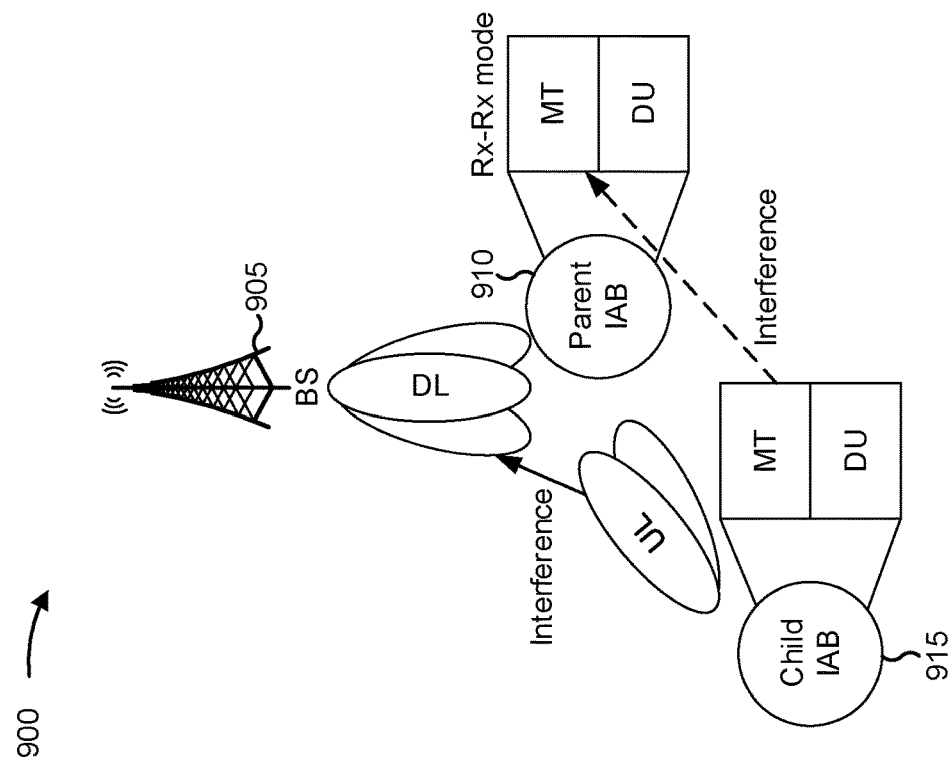

FIG. 9 is a diagram illustrating an example 900 of TPMI precoder configuration based at least in part on interference, in accordance with the present disclosure. As shown in FIG. 9, a base station 905 (e.g., which may include at least one of base station 110, anchor base station 335, non-anchor base station 345, IAB-donor 405, IAB-node 410, a DU of one of the aforementioned nodes), a parent IAB node 910 (e.g., which may include at least one of base station 110, non-anchor base station 345, IAB-node 410), and a child IAB node 915 (e.g., which may include at least one of base station 110, UE 120, non-anchor base station 345, IAB-node 410) communicate via an IAB network.

In some aspects, interference may prevent or hamper simultaneous activity of a DU and an MT by the parent IAB node 910. For example, as shown in FIG. 9, a downlink transmission received by the MT of the parent IAB node 910 from the base station 905 (e.g., the DU) may be subject to interference from an uplink transmission received by the DU of the parent IAB node 910 from the MT of the child IAB node 915. Thus, the parent IAB node 910 is illustrated in an Rx-Rx mode.

To enable simultaneous activity of the DU and the MT at the parent IAB node 910, the parent IAB node 910 may configure the child IAB node 915 with one or more precoders configured to avoid interference during such simultaneous activity. For example, one or more beam-pairs may be subject to higher interference relative to other beam-pairs. As described herein, the child IAB node 915 may be configured to utilize one or more TPMI precoders potentially associated with the one or more beam-pairs during non-simultaneous activity of the DU and the MT and may be configured to utilize one or more TPMI precoders associated with the other beam-pairs (that is, non-interfering beam pairs) when both the DU and the MT are active.

As shown by reference number 920, the parent IAB node 910 may receive PMI indication from the base station 905. The PMI indication may be associated with a downlink transmission to the DU of the parent IAB node 910. In some aspects, the PMI indication may indicate a selected PMI (for example, based at least in part on a PMI report transmitted by the parent IAB node 910). As further shown, in some aspects, the parent IAB node 910 may receive a PMI subset restriction from the base station 905. In some aspects, the PMI subset restriction may include a first PMI subset restriction that allows one or more precoders that are associated with the interference at the MT and a second PMI subset restriction that disallows the one or more precoders that are associated with the interference at the MT, as described elsewhere herein. In some aspects, the PMI subset restriction may indicate a group of PMIS that cannot be selected (e.g., that are disallowed). In some other aspects, the PMI subset restriction may be independent of whether or not the MT and the DU of the parent IAB node 910 are simultaneously active.

In some aspects, the parent IAB node 910 may select a PMI parameter based at least in part on the PMI subset restriction and/or the PMI indication. In some aspects, the PMI parameter may include a TPMI precoder for an uplink transmission to the MT of the parent IAB 910. For example, as shown by reference number 925, the parent IAB node 910 may select a TPMI for the child IAB node 915 based at least in part on the PMI subset restriction and/or the PMI indication. For example, the parent IAB node 910 may select a TPMI for the child IAB node 915 that corresponds to a beam that does not interfere with a PMI indicated by the PMI indication. As another example, the parent IAB node 910 may select a TPMI for the child IAB node 915 that corresponds to a beam that does not interfere with any allowed PMI (that is, any PMI not included in the PMI subset restriction). As shown by reference number 930, the parent IAB node 910 may provide the TPMI precoder to the child IAB node 915.

In the above example, the parent IAB node 910 selects a single TPMI for the child IAB node 915 and configures the child IAB node 915 with the selected TPMI. IN some aspects, the parent IAB node may configure multiple PMI parameters (e.g., multiple TPMIs) which the child IAB node 915 can selectively use based at least in part on whether the MT and the DU of the parent IAB node 910 are simultaneously active. For example, as shown by reference number 935, the parent IAB node 910 may provide configuration information to the child IAB node 915 (such as the MT of the child IAB node 915). In some aspects, the configuration information may indicate one or more TPMI precoders. For example, as shown in FIG. 9, the configuration information may indicate a first TPMI precoder to be used when the DU and the MT of the parent IAB node 910 are not simultaneously active. The configuration information may indicate a second TPMI precoder to be utilized when the DU and the MT of the parent IAB node 910 are simultaneously active. For example, the second TPMI precoder may be associated with a beam that does not cause interference with an MT of the parent IAB node 910 during transmissions by the child IAB node 915.

In some aspects, the child IAB node 915 may determine whether the DU and the MT at the parent IAB node 910 are simultaneously active and/or whether to use the first TPMI precoder or the second TPMI precoder based at least in part on signaling received from the parent IAB node 910. For example, as shown by reference number 940, the parent IAB node 910 may transmit an indication that the DU and the MT of the parent IAB node 910 are simultaneously active to the child IAB node 915. In some aspects, the indication may be a dynamic indication (such as associated with a particular communication, via downlink control information, or the like). In some other aspects, the indication may be a bitmap, a resource map, or the like.

In some aspects, the parent IAB node 910 may communicate with the base station 905 and the child IAB node 915 based at least in part on the TPMI precoder indicated by the parent IAB node 910. For example, as shown by reference number 945, the parent IAB node 910 may receive a downlink communication from the base station 905 in accordance with the PMI indication or the PMI subset restriction. As shown by reference number 950, the parent IAB node 910 may receive an uplink communication from the child IAB node 915 in accordance with the second TPMI precoder based at least in part on the indication provided to the child IAB node 915 by the parent IAB node 910.

As indicated above, FIG. 9 is provided as an example. Other examples may differ from what is described with regard to FIG. 9.

Figure 10:
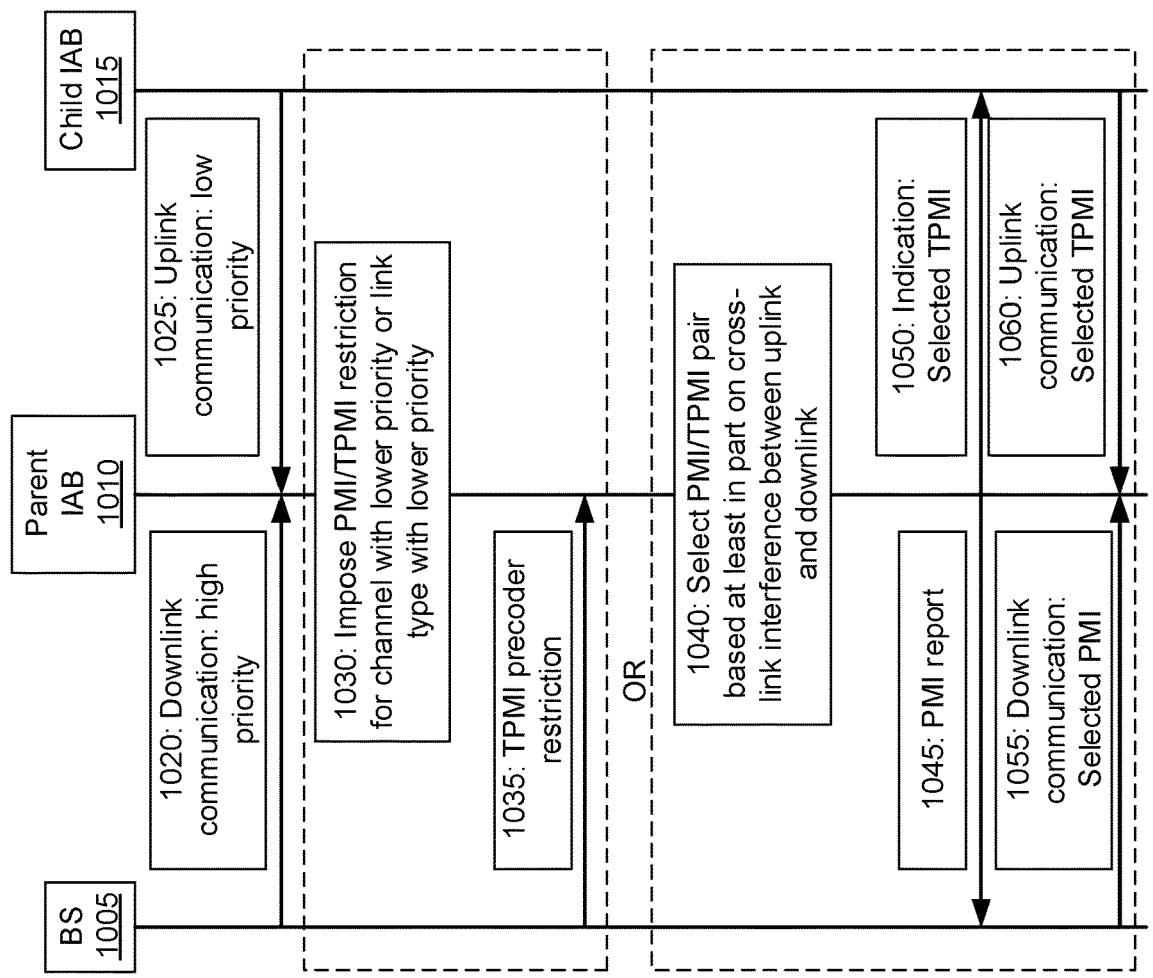
FIG. 10 is a diagram illustrating an example of PMI subset restriction and TPMI precoder configuration based at least in part on interference, in accordance with the present disclosure.
Figure 10:
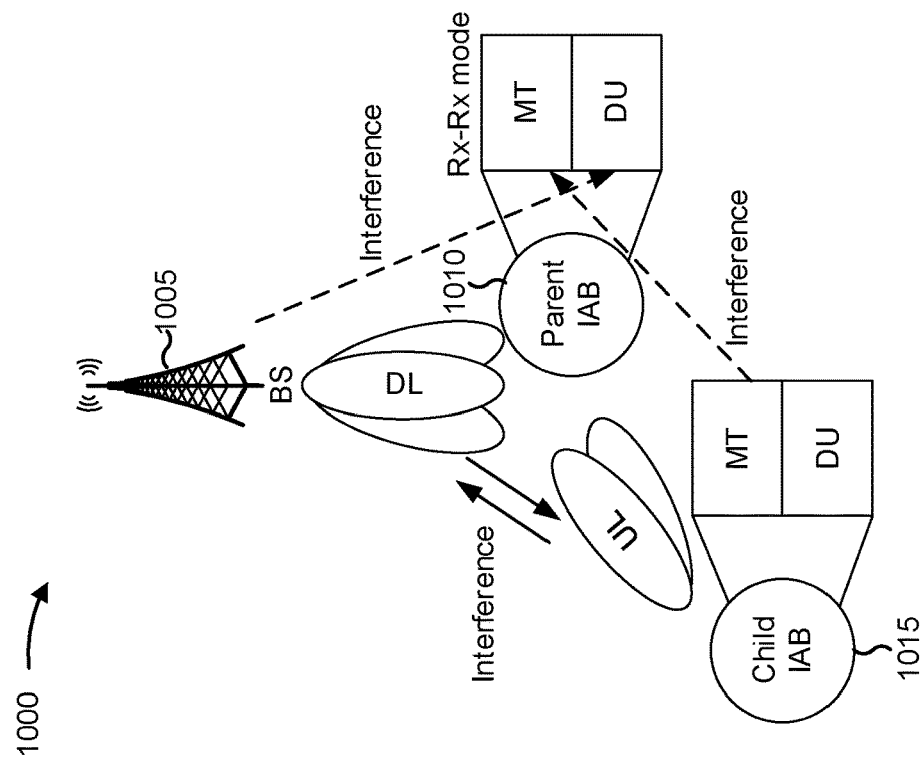

FIG. 10 is a diagram illustrating an example of PMI subset restriction and TPMI precoder configuration based at least in part on interference, in accordance with the present disclosure. As shown in FIG. 10, a base station 1005 (e.g., which may include at least one of base station 110, anchor base station 335, non-anchor base station 345, IAB-donor 405, IAB-node 410, a DU of one of the aforementioned nodes), a parent IAB node 1010 (e.g., which may include at least one of base station 110, non-anchor base station 345, IAB-node 410), and a child IAB node 1015 (e.g., which may include at least one of base station 110, UE 120, non-anchor base station 345, IAB-node 410) communicate via an IAB network.

In some aspects, interference may prevent simultaneous activity of a DU and an MT by the parent IAB node 1010. In example 100, both of the MT and the DU of the parent IAB node 1010 are subject to the interference. For example, a downlink transmission of the BS 1005 may interfere with a DU of the parent IAB node 1010, and an uplink transmission of the child IAB node 1015 may interfere with an MT of the parent IAB node 1010. For example, as shown in FIG. 10, a downlink transmission received by the parent IAB node 1010 from the base station 1005 and an uplink transmission received by the parent IAB node 1010 from the child IAB node 1015 may cause interference at a DU and an MT of the parent IAB node 1010, respectively. Techniques and apparatuses described herein provide priority-based precoder restriction for handling a scenario when both of the DU and the MT are victims of interference.

In some aspects, the base station 1005 or the parent IAB node 1010 may determine a priority associated with an uplink channel and a downlink channel of the parent IAB node 1010 based at least in part on the interference at the DU and the MT of the parent IAB node 1010. As shown by reference numbers 1020 and 1025, the base station 1005 may determine that an uplink channel of the parent IAB node 910 has a higher priority relative to a downlink channel of the parent IAB node 910. Additionally, or alternatively, the base station 1005 or the parent IAB node 1010 may determine respective priorities associated with a link on which the downlink channel is received and a link on which the uplink channel is received. For example, the respective priorities may be based at least in part on whether the respective links are backhaul links or access links.

As shown by reference number 1030, the base station 1005 may impose a PMI subset restriction and/or a TPMI restriction for the channel with the lower priority. Alternatively, and/or additionally, the base station 1005 may impose a PMI subset restriction and/or a TPMI restriction for the link with the lower priority. As shown by reference number 1035, the base station 1005 may provide a TPMI precoder restriction to the parent IAB node 1010 based at least in part on the uplink communication of the parent IAB node 1010 having a lower priority relative to the downlink communication of the parent IAB node 1010. The TPMI precoder restriction may constrain the set of TPMI precoders that the parent IAB node 1010 (e.g., the DU of the parent IAB node 1010) can select for the child IAB node 1015. For example, the TPMI precoder restriction may enable the parent IAB node to select only TPMIs that are not associated with interference in the scenario illustrated in example 1000.

If the downlink communication (or the link on which the downlink communication is carried) were to have the lower priority, then the BS 1005 may limit the PMI choice at the parent IAB node 1010 (e.g., the MT of the parent IAB node 1010). For example, the BS 1005 may provide a PMI subset restriction configuring the parent IAB node 1010 not to select a beam associated with interference in the scenario illustrated in example 1000. Additionally, or alternatively, the BS 1005 may provide a first PMI subset restriction and a second PMI subset restriction, where the second PMI subset restriction is associated with simultaneous operation of the MT and the DU.

In the above example, the BS 1005 configures the parent IAB node 1010 with a PMI subset restriction or a TPMI restriction based at least in part on respective priorities of channels or links. In some aspects, the parent IAB node 1010 may determine a PMI and a TPMI based at least in part on interference associated with the link with the base station 1005 and the child IAB node 1015. For example, as shown by reference number 1040, the parent IAB node 1010 may select a PMI/TPMI pair based at least in part on cross-link interference between the uplink and the downlink. A PMI/TPMI pair includes a PMI corresponding to a downlink beam (e.g., of the BS 1005) and a TPMI corresponding to an uplink beam (e.g., of the child IAB node 1015). In some aspects, the parent IAB node 1010 may select the PMI/TPMI pair based at least in part on the respective link types associated with the MT and the DU. In some aspects, the parent IAB node 1010 may select the PMI/TPMI pair based at least in part on a resource sharing pattern between the parent IAB node 1010 and the child IAB node 1015. For example, the PMI/TPMI pair may be selected based at least in part on whether the resource sharing pattern is associated with TDM, FDM, or SDM, or based at least in part on how resources associated with the parent IAB node 1010 and the child IAB node 1015 are multiplexed. In some aspects, the resource sharing pattern may be mapped to a sequence of PMI/TPMI pairs. For example, the parent IAB node 1010 or the base station 1005 may configure a bitmap indicating a mapping between particular resources of the resource sharing pattern and PMI/TPMI pairs to be used for the particular resources. In some aspects, the selected PMI parameter indicates a PMI for the DU and a TPMI precoder for the MT. For example, the selected PMI parameter may indicate a PMI/TPMI pair. The parent IAB node 1010 may select the PMI codebook and/or the TPMI precoder based at least in part on the cross-link interference between the uplink and the downlink.

As shown by reference number 1045, the parent IAB node 1010 may provide a PMI report to the base station 1005. The base station 1005 may receive the PMI report. The base station 1005 may communicate with the parent IAB node 1010 using a precoder indicated by the PMI report. As shown by reference number 1050, the parent IAB node 1010 may provide an indication of the selected TPMI to the child IAB node 1015.

As shown by reference number 1055, the parent IAB node 1010 may communicate via the downlink in accordance with the selected PMI. As shown by reference number 1060, the parent IAB node 1010 may communicate via the uplink in accordance with the selected TPMI.

As indicated above, FIG. 10 is provided as an example. Other examples may differ from what is described with regard to FIG. 10.

Figure 11:
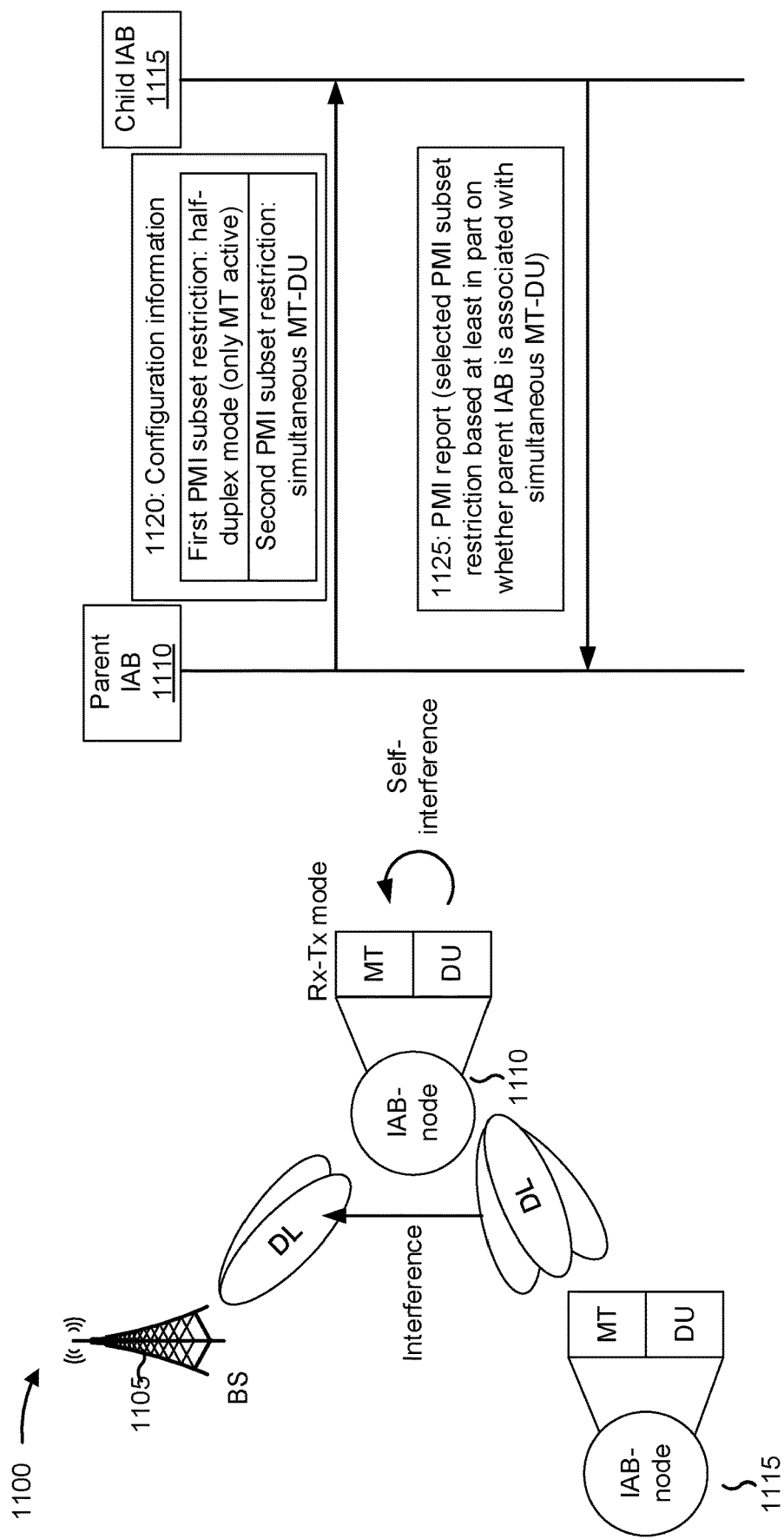
FIG. 11 is a diagram illustrating an example of PMI subset restriction based at least in part on interference, in accordance with the present disclosure.

FIG. 11 is a diagram illustrating an example 1100 of PMI subset restriction based at least in part on interference, in accordance with the present disclosure. As shown in FIG. 11, a base station 1105 (e.g., which may include at least one of base station 110, anchor base station 335, non-anchor base station 345, IAB-donor 405, IAB-node 410, a DU of one of the aforementioned nodes), a parent IAB node 1110 (e.g., which may include at least one of base station 110, non-anchor base station 345, IAB-node 410), and a child IAB node 1115 (e.g., which may include at least one of base station 110, UE 120, non-anchor base station 345, IAB-node 410) communicate via an IAB network. As also shown in FIG. 11, a DU and an MT of the parent IAB node 1110 experience self-interference. For example, a downlink transmission by the DU of the parent IAB node 1110 may interfere with a downlink reception by the MT of the parent IAB node 1110, such as due to a downlink beam having leakage to an MT panel.

As shown by reference number 1120, the parent IAB node 1110 may provide configuration information to the child IAB node 1115. The configuration information may include a first PMI subset restriction and a second PMI subset restriction. In some aspects, the first PMI subset restriction may restrict the child IAB node 1115 to a half-duplex mode when only the MT of the parent IAB node 1110 is active. In some aspects, the second PMI subset restriction may include a PMI subset restriction associated with the DU and the MT of the parent IAB node 1110 being simultaneously active.

As shown by reference number 1125, the child IAB node 1115 may provide a PMI report to the parent IAB node 1110. The PMI report may indicate the selected PMI subset restriction based at least in part on whether the DU and the MT of the parent IAB node 1110 are simultaneously active. For example, if the DU and the MT are simultaneously active, the PMI report may indicate the second PMI subset restriction, and if the DU and the MT are not simultaneously active (e.g., the parent IAB node 1110 is in a half-duplex mode), the PMI report may indicate the first PMI subset restriction. The child IAB node 1115 may determine whether or not the DU and the MT are simultaneously active based at least in part on information from the parent IAB node 1110, such as configured information indicating whether the DU and the MT are simultaneously active (e.g., a resource map), a dynamic indication of whether the DU and the MT are simultaneously active, or the like.

As indicated above, FIG. 11 is provided as an example. Other examples may differ from what is described with regard to FIG. 11.

Figure 12:
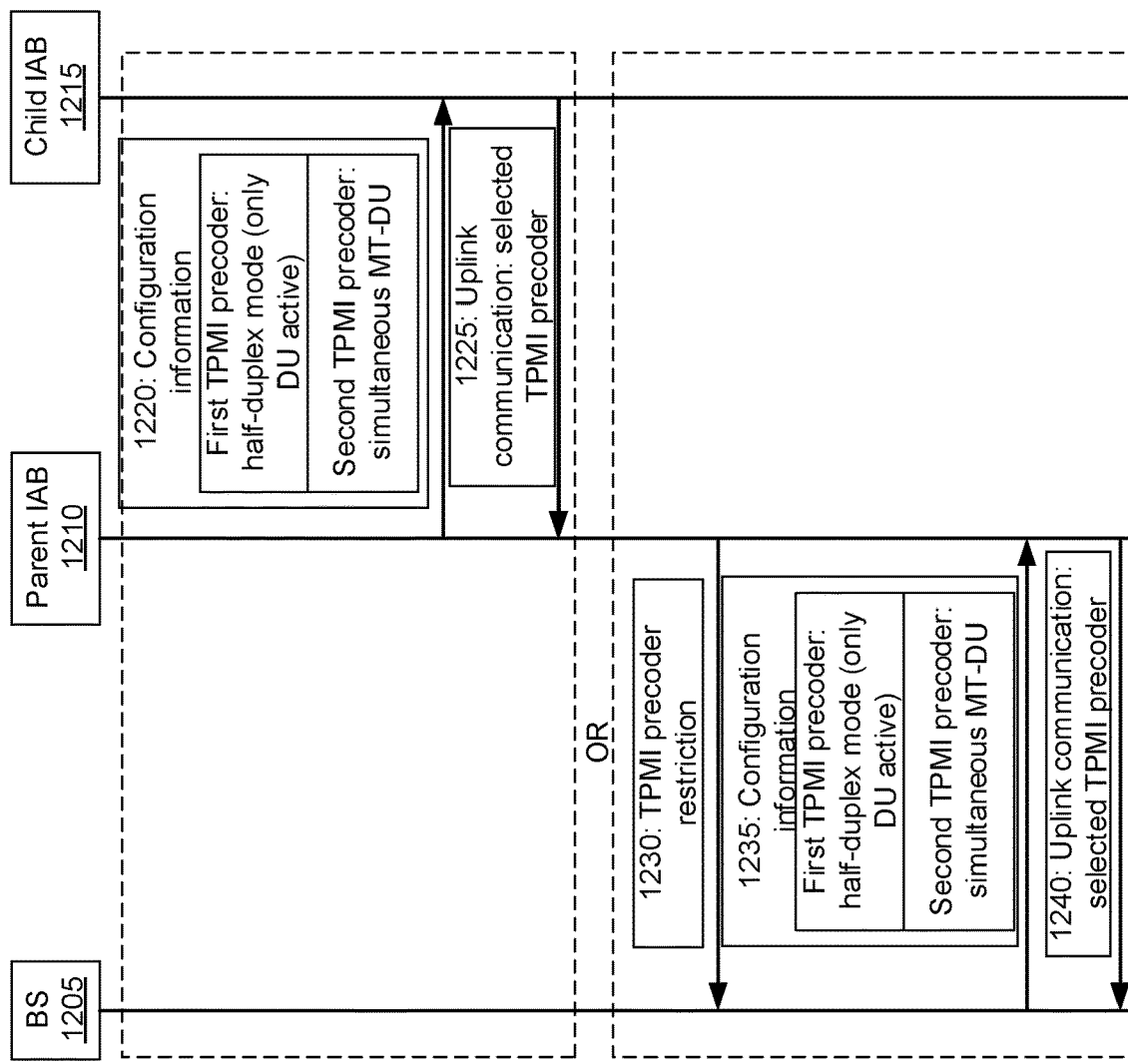
FIG. 12 is a diagram illustrating an example of TPMI restriction based at least in part on interference, in accordance with the present disclosure.
Figure 12:
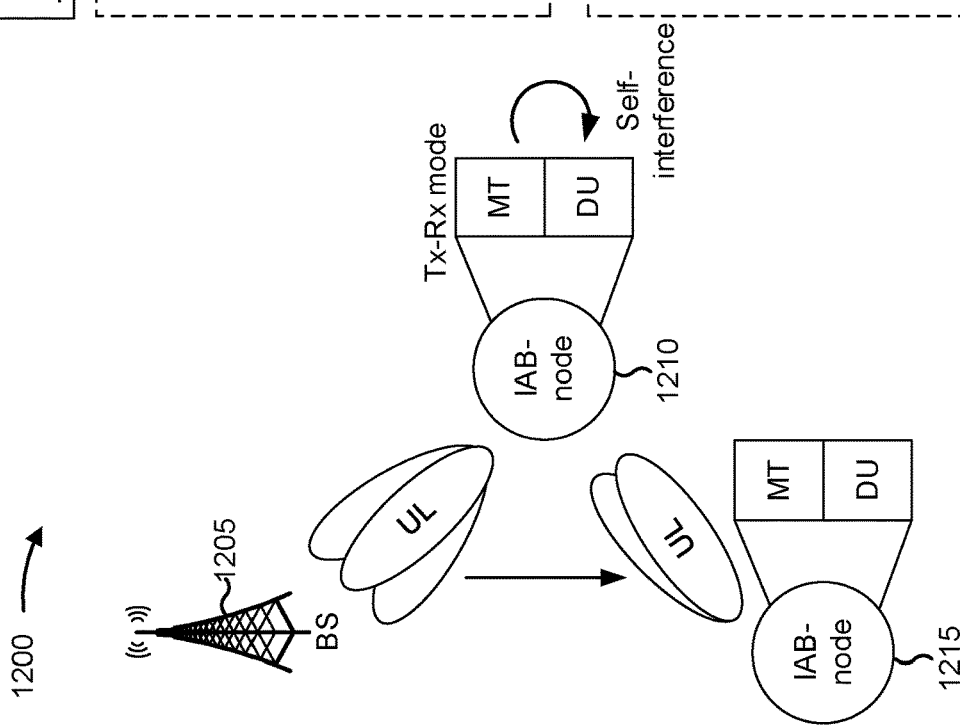

FIG. 12 is a diagram illustrating an example 1200 of TPMI restriction based at least in part on interference, in accordance with the present disclosure. As shown in FIG. 12, a base station 1205 (e.g., base station 110, anchor base station 335, non-anchor base station 345, IAB-donor 405, IAB-node 410, a DU of one of the aforementioned nodes), a parent IAB node 1210 (e.g., base station 110, non-anchor base station 345, IAB-node 410), and a child IAB node 1215 (e.g., base station 110, UE 120, non-anchor base station 345, IAB-node 410) communicate via an IAB network. As also shown in FIG. 12, the parent IAB node 1210 may experience self-interference at a DU and an MT of the parent IAB node 1210. For example, an uplink transmission by the MT of the parent IAB node 1210 may interfere with an uplink reception by the DU of the parent IAB node 1210.

As shown by reference number 1220, the parent IAB node 1210 may provide configuration information to the child IAB node 1215. In some aspects, the configuration information indicates a first TPMI precoder and a second TPMI precoder. The first TPMI precoder may be used when only the DU of the parent IAB node 1210 is active. The second TPMI precoder may be used when the DU and the MT of the parent IAB node 1210 are simultaneously active. For example, the second TPMI precoder may not be associated with a beam that is associated with leakage to the DU panel. The child IAB node 1215 may determine whether or not the DU and the MT are simultaneously active based at least in part on information from the parent IAB node 1210, such as configured information indicating whether the DU and the MT are simultaneously active (e.g., a resource map), a dynamic indication of whether the DU and the MT are simultaneously active, or the like.

As shown by reference number 1225, the child IAB node 1215 may communicate via the uplink with the parent IAB node 1210 in accordance with one of the first TPMI precoder or the second TPMI precoder based at least in part on whether the MT and the DU of the parent IAB node 1210 are simultaneously active. For example, if the MT and the DU are simultaneously active, the child IAB node 1215 may communicate using the second TPMI precoder. If only the DU is active, the child IAB node 1215 may communicate using the first TPMI precoder.

In the above example, the parent IAB node 1210 select TPMI precoders for the child IAB node 1215 to avoid self-interference. In some aspects, the parent IAB node 1210 may indicate a TPMI restriction to the base station 1205 such that the base station 1205 does not select a TPMI precoder for the parent IAB node 1210 that causes self-interference. For example, as shown by reference number 1230, the parent IAB node 1210 provide a TPMI restriction to the base station 1205. The TPMI restriction may indicate one or more TPMIs that are permitted for selection for the parent IAB node 1210. The one or more TPMIs may be associated with satisfactory interference at the DU (e.g., less than a threshold). Additionally, or alternatively, the TPMI restriction may indicate one or more TPMIs that are disallowed for selection at the parent IAB node, such as based at least in part on the one or more TPMIs being associated with self-interference between the MT and the DU. As shown by reference number 1235, the base station 1205 may provide configuration information to the parent JAB node 1210 based at least in part on the TPMI precoder restriction. The configuration information may indicate a TPMI precoder that is selected in accordance with the TPMI restriction. Thus, the parent JAB node 1210 may prevent selection, by the base station 1205, of a beam associated with self-interference when used by the MT of the parent JAB node 1210.

As shown by reference number 1240, the parent JAB node 1210 may communicate via the uplink with the base station 1205 in accordance with one of the first TPMI precoder or the second TPMI precoder based at least in part on whether the MT and the DU of the parent JAB node 1210 are simultaneously active.

As indicated above, FIG. 12 is provided as an example. Other examples may differ from what is described with regard to FIG. 12.

Figure 13:
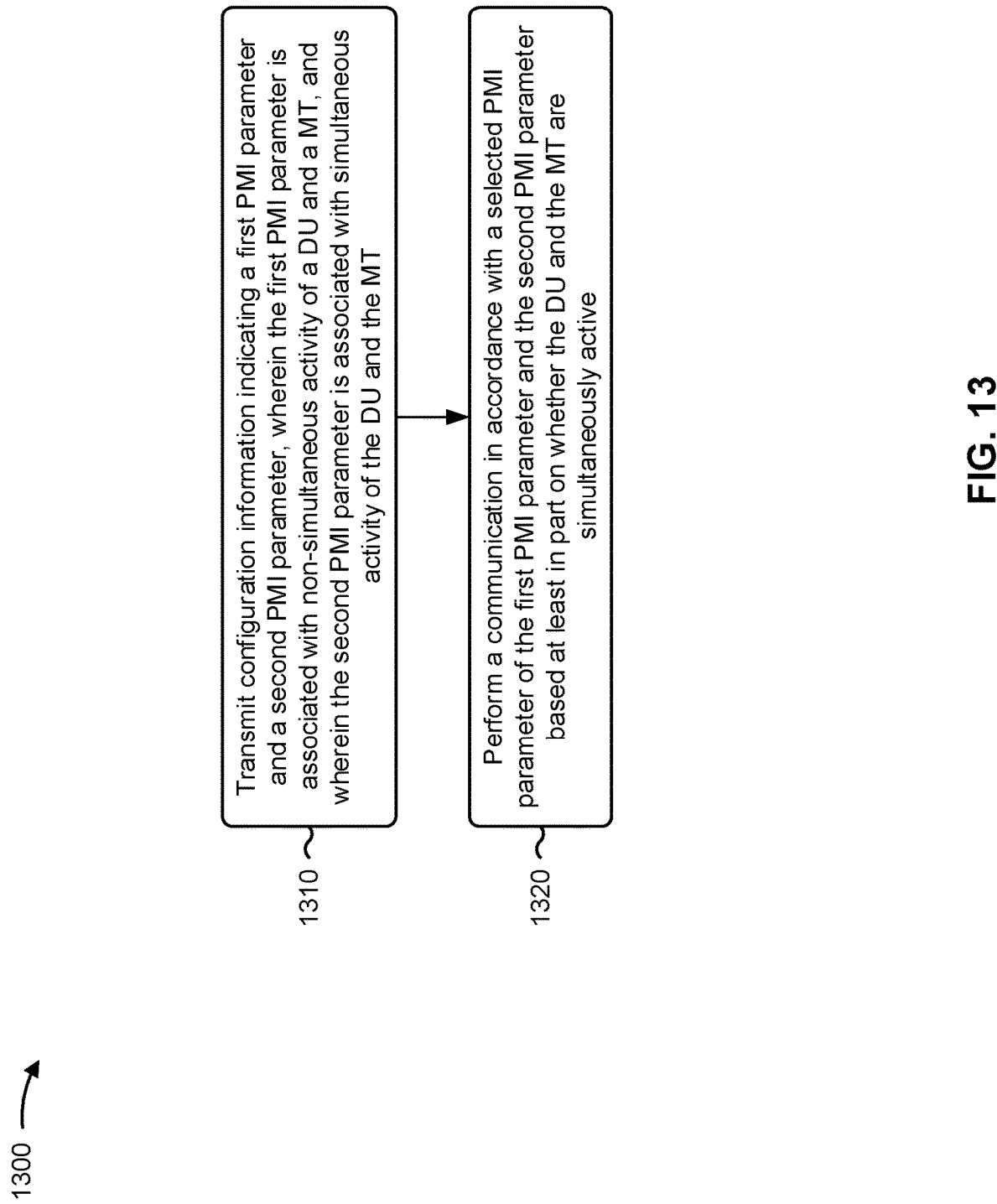
FIGS. 13 and 14 are diagrams illustrating example processes associated with precoder selection in IAB, in accordance with the present disclosure.

FIG. 13 is a diagram illustrating an example process 1300 performed, for example, by a wireless node, in accordance with the present disclosure. Example process 1300 is an example where the wireless node (e.g., base station 110, anchor base station 335, non-anchor base station 345, IAB donor 405, IAB node 410, base station 805, base station 905, base station 1005, base station 1105, base station 1205, parent JAB node 810, parent JAB node 910, parent JAB node 1010, parent JAB node 1110, parent JAB node 1210) performs operations associated with precoder selection in an JAB network.

As shown in FIG. 13, in some aspects, process 1300 may include transmitting configuration information indicating a first PMI parameter and a second PMI parameter, wherein the first PMI parameter is associated with non-simultaneous activity of a DU and an MT, and wherein the second PMI parameter is associated with simultaneous activity of the DU and the MT (block 1310). For example, the wireless node (e.g., using communication manager 150 and/or transmission component 1504, depicted in FIG. 15) may transmit configuration information indicating a first PMI parameter and a second PMI parameter, wherein the first PMI parameter is associated with non-simultaneous activity of a DU and an MT, and wherein the second PMI parameter is associated with simultaneous activity of the DU and the MT, as described above.

As further shown in FIG. 13, in some aspects, process 1300 may include performing a communication in accordance with a selected PMI parameter of the first PMI parameter and the second PMI parameter based at least in part on whether the DU and the MT are simultaneously active (block 1320). For example, the wireless node (e.g., using communication manager 150 and/or performance component 1508, depicted in FIG. 15) may perform a communication in accordance with a selected PMI parameter of the first PMI parameter and the second PMI parameter based at least in part on whether the DU and the MT are simultaneously active, as described above. The communication may include receiving an uplink transmission using an indicated TPMI precoder, or performing a downlink transmission using a beam indicated by a PMI of a PMI subset restriction.

Process 1300 may include additional aspects, such as any single aspect or any combination of aspects described below and/or in connection with one or more other processes described elsewhere herein.

In a first aspect, the first PMI parameter is a first PMI subset restriction or a first TPMI precoder that allows one or more precoders that are associated with interference at one or more of the MT or the DU, and the second PMI parameter is a second PMI subset restriction or a second TPMI precoder that disallows the one or more precoders that are associated with interference at one or more of the MT or the DU.

In a second aspect, alone or in combination with the first aspect, the interference is associated with a reception at the MT interfering with a reception at the DU, wherein the DU and the MT are at an integrated access and backhaul node configured by the wireless node.

In a third aspect, alone or in combination with one or more of the first and second aspects, performing the communication further comprises receiving a PMI report using a PMI subset restriction of the selected PMI parameter, and communicating with a downstream node using a precoder indicated by the PMI report.

In a fourth aspect, alone or in combination with one or more of the first through third aspects, the interference is associated with a reception at the DU interfering with a reception at the ME, wherein the configuration information is transmitted to a child integrated access and backhaul node of the wireless node, and wherein the DU and the MT are at the wireless node.

In a fifth aspect, alone or in combination with one or more of the first through fourth aspects, process 1300 includes selecting the selected PMI parameter based at least in part on a PMI subset restriction associated with a downlink transmission to the DU or on a PMI indication associated with the downlink transmission, wherein the selected PMI parameter is a TPMI precoder for an uplink transmission from the MT.

In a sixth aspect, alone or in combination with one or more of the first through fifth aspects, process 1300 includes transmitting signaling indicating whether to use the first TPMI precoder or the second TPMI precoder.

In a seventh aspect, alone or in combination with one or more of the first through sixth aspects, the interference is associated with a transmission of the DU interfering with a reception at the MT, and the DU and the MT are at the wireless node.

In an eighth aspect, alone or in combination with one or more of the first through seventh aspects, performing the communication further comprises receiving a PMI report from a child integrated access and backhaul node, wherein the PMI report uses a PMI subset restriction of the selected PMI parameter.

In a ninth aspect, alone or in combination with one or more of the first through eighth aspects, the interference is caused by an uplink transmission of the MT interfering with an uplink reception at the DU.

In a tenth aspect, alone or in combination with one or more of the first through ninth aspects, process 1300 includes receiving, from an IAB node and prior to transmitting the configuration information, information indicating a TPMI codebook restriction, wherein the first TPMI precoder and the second TPMI precoder are in accordance with the TPMI codebook restriction, and wherein the MT and the DU are at the IAB node.

In an eleventh aspect, alone or in combination with one or more of the first through tenth aspects, process 1300 includes transmitting signaling that indicates whether to use the first TPMI precoder or the second TPMI precoder.

In a twelfth aspect, alone or in combination with one or more of the first through eleventh aspects, the configuration information includes a bitmap indicating whether the second PMI parameter is active for a set of resources.

In a thirteenth aspect, alone or in combination with one or more of the first through twelfth aspects, the set of resources is a set of time resources.

In a fourteenth aspect, alone or in combination with one or more of the first through thirteenth aspects, the set of resources is a set of frequency resources.

In a fifteenth aspect, alone or in combination with one or more of the first through fourteenth aspects, process 1300 includes updating the bitmap based at least in part on transmitting a resource release.

In a sixteenth aspect, alone or in combination with one or more of the first through fifteenth aspects, the selected PMI parameter is selected based at least in part on a frequency configuration of resources configured for the wireless node.

In a seventeenth aspect, alone or in combination with one or more of the first through sixteenth aspects, the configuration information indicates three or more PMI parameters associated with different frequency configurations of resources configured for the wireless node.

In an eighteenth aspect, alone or in combination with one or more of the first through seventeenth aspects, the selected PMI parameter is the second PMI parameter, wherein the wireless node is associated with simultaneous interference at the MT and the DU, and wherein the selected PMI parameter is selected based at least in part on respective priorities associated with communications of the MT and the DU.

In a nineteenth aspect, alone or in combination with one or more of the first through eighteenth aspects, the selected PMI parameter is the second PMI parameter, wherein the wireless node is associated with simultaneous interference at the MT and the DU, and wherein the selected PMI parameter is selected based at least in part on respective link types of links associated with the MT and the DU.

In a twentieth aspect, alone or in combination with one or more of the first through nineteenth aspects, the wireless node is associated with simultaneous interference at the MT and the DU, wherein the selected PMI parameter indicates a PMI codebook for the DU and a TPMI precoder for the MT, and wherein the PMI codebook and the TPMI precoder are selected based at least in part on cross-link interference between a link associated with the DU and a link associated with the MT.

In a twenty-first aspect, alone or in combination with one or more of the first through twentieth aspects, the selected PMI parameter is selected based at least in part on a resource sharing pattern between the wireless node and an integrated access and backhaul node.

In a twenty-second aspect, alone or in combination with one or more of the first through twenty-first aspects, the resource sharing pattern is mapped to a sequence of pairs of PMI codebooks and TPMI precoders.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
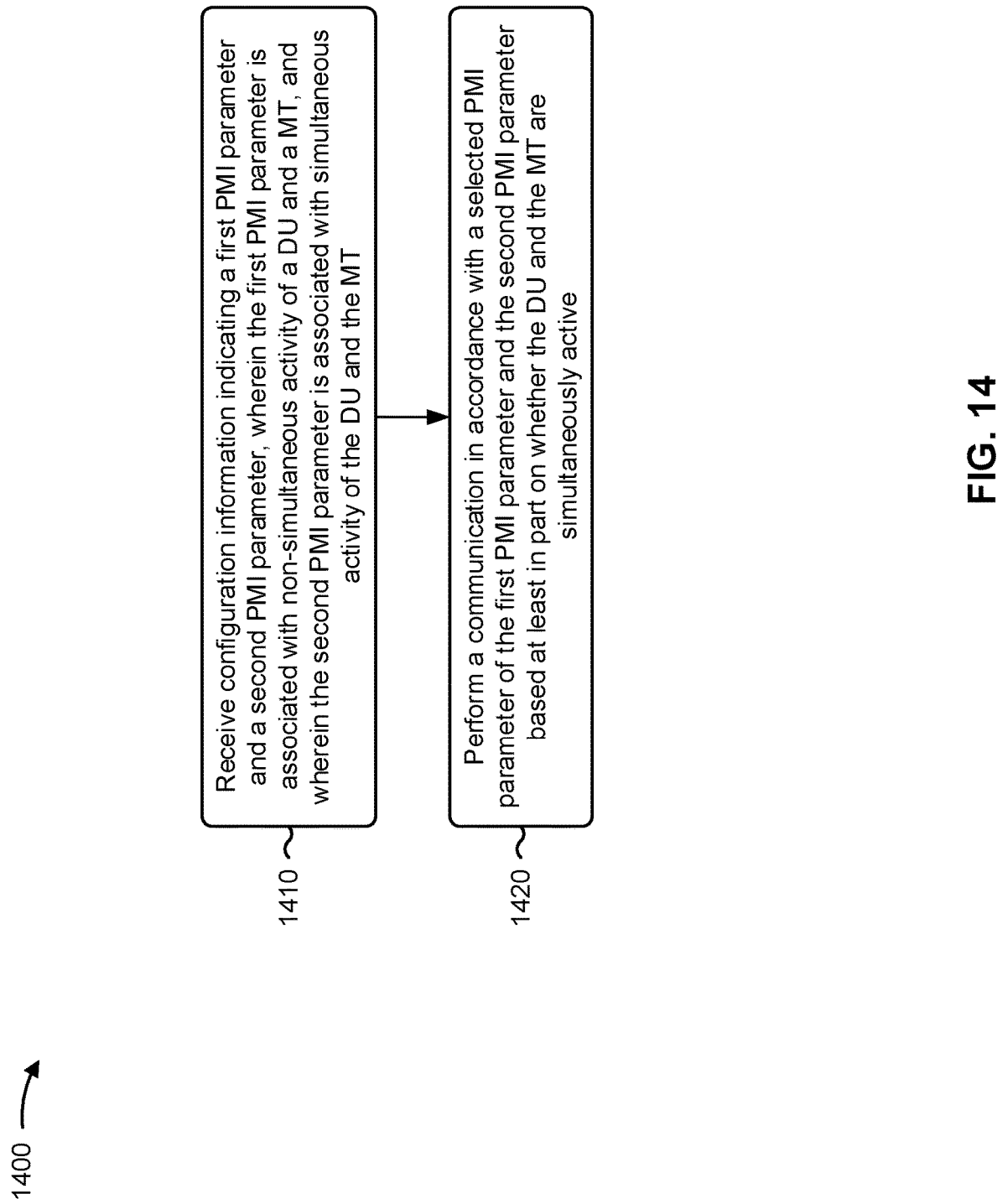

FIG. 14 is a diagram illustrating an example process 1400 performed, for example, by an IAB node, in accordance with the present disclosure. Example process 1400 is an example where the IAB node (e.g., base station 110, 805, 905, 1005, 1105, 1205, IAB node 810, 910, 1010, 1110, 1210) performs operations associated with precoder selection in an IAB network.

As shown in FIG. 14, in some aspects, process 1400 may include receiving configuration information indicating a first PMI parameter and a second PMI parameter, wherein the first PMI parameter is associated with non-simultaneous activity of a DU and an MT, and wherein the second PMI parameter is associated with simultaneous activity of the DU and the MT (block 1410). For example, the IAB node (e.g., using communication manager 150 and/or reception component 1602, depicted in FIG. 16) may receive configuration information indicating a first PMI parameter and a second PMI parameter, wherein the first PMI parameter is associated with non-simultaneous activity of a DU and an MT, and wherein the second PMI parameter is associated with simultaneous activity of the DU and the MT, as described above. In some aspects, the configuration information may indicate only a single PMI parameter. For example, the configuration information may indicate a single PMI subset restriction or a single TPMI precoder, as described in more detail elsewhere herein.

As further shown in FIG. 14, in some aspects, process 1400 may include performing a communication in accordance with a selected PMI parameter of the first PMI parameter and the second PMI parameter based at least in part on whether the DU and the MT are simultaneously active (block 1420). For example, the IAB node (e.g., using communication manager 150 and/or performance component 1608, depicted in FIG. 16) may perform a communication in accordance with a selected PMI parameter of the first PMI parameter and the second PMI parameter based at least in part on whether the DU and the MT are simultaneously active, as described above. If the configuration information identifies a single PMI parameter, the IAB node may perform the communication in accordance with the single PMI parameter.

Process 1400 may include additional aspects, such as any single aspect or any combination of aspects described below and/or in connection with one or more other processes described elsewhere herein.

In a first aspect, the first PMI parameter is a first PMI subset restriction or a first TPMI precoder that allows one or more precoders that are associated with interference at one or more of the MT or the DU, and the second PMI parameter is a second PMI subset restriction or a second TPMI precoder that disallows the one or more precoders that are associated with interference at one or more of the MT or the DU.

In a second aspect, alone or in combination with the first aspect, the interference is associated with a reception at the MT interfering with a reception at the DU, wherein the DU and the MT are at the IAB node.

In a third aspect, alone or in combination with one or more of the first and second aspects, performing the communication further comprises transmitting a PMI report using a PMI subset restriction of the selected PMI parameter.

In a fourth aspect, alone or in combination with one or more of the first through third aspects, the interference is associated with a reception at the DU interfering with a reception at the MT, wherein the configuration information is received from a parent IAB node of the IAB node, and wherein the DU and the MT are at the parent IAB node.

In a fifth aspect, alone or in combination with one or more of the first through fourth aspects, process 1400 includes receiving signaling indicating whether to use the first TPMI precoder or the second TPMI precoder.

In a sixth aspect, alone or in combination with one or more of the first through fifth aspects, the interference is associated with a transmission of the DU interfering with a reception at the MT, wherein the configuration information is received from a parent IAB node of the IAB node, and wherein the DU and the MT are at the parent IAB node.

In a seventh aspect, alone or in combination with one or more of the first through sixth aspects, performing the communication further comprises transmitting a PMI report to the parent IAB node using a PMI subset restriction of the selected PMI parameter.

In an eighth aspect, alone or in combination with one or more of the first through seventh aspects, the interference is caused by an uplink transmission of the MT interfering with an uplink reception at the DU.

In a ninth aspect, alone or in combination with one or more of the first through eighth aspects, process 1400 includes transmitting, prior to receiving the configuration information, information indicating a TPMI codebook restriction, wherein the first TPMI precoder and the second TPMI precoder satisfy the TPMI codebook restriction, and wherein the MT and the DU are at the IAB node.

In a tenth aspect, alone or in combination with one or more of the first through ninth aspects, process 1400 includes receiving signaling that indicates whether to use the first TPMI precoder or the second TPMI precoder, wherein the configuration information is received from a parent IAB node of the IAB node, and wherein the DU and the MT are at the parent IAB node.

In an eleventh aspect, alone or in combination with one or more of the first through tenth aspects, the configuration information includes a bitmap indicating whether the second PMI parameter is active for a set of resources.

In a twelfth aspect, alone or in combination with one or more of the first through eleventh aspects, the set of resources is a set of time resources.

In a thirteenth aspect, alone or in combination with one or more of the first through twelfth aspects, the set of resources is a set of frequency resources.

In a fourteenth aspect, alone or in combination with one or more of the first through thirteenth aspects, process 1400 includes updating the bitmap based at least in part on receiving a resource release.

In a fifteenth aspect, alone or in combination with one or more of the first through fourteenth aspects, the selected PMI parameter is selected based at least in part on a frequency configuration of resources configured for the IAB node.

In a sixteenth aspect, alone or in combination with one or more of the first through fifteenth aspects, the configuration information indicates three or more PMI parameters associated with different frequency configurations of resources configured for the IAB node.

In a seventeenth aspect, alone or in combination with one or more of the first through sixteenth aspects, the selected PMI parameter is the second PMI parameter, and the second PMI parameter is selected based at least in part on a priority associated with the communication.

In an eighteenth aspect, alone or in combination with one or more of the first through seventeenth aspects, the selected PMI parameter is the second PMI parameter, and the second PMI parameter is selected based at least in part on a type of link on which the communication is performed.

In a nineteenth aspect, alone or in combination with one or more of the first through eighteenth aspects, the selected PMI parameter is selected based at least in part on cross-link interference between a link associated with the DU and a link associated with the MT.

In a twentieth aspect, alone or in combination with one or more of the first through nineteenth aspects, the selected PMI parameter is selected based at least in part on a resource sharing pattern between the IAB node and another IAB node.

In a twenty-first aspect, alone or in combination with one or more of the first through twentieth aspects, the resource sharing pattern is mapped to information indicating the selected PMI parameter.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
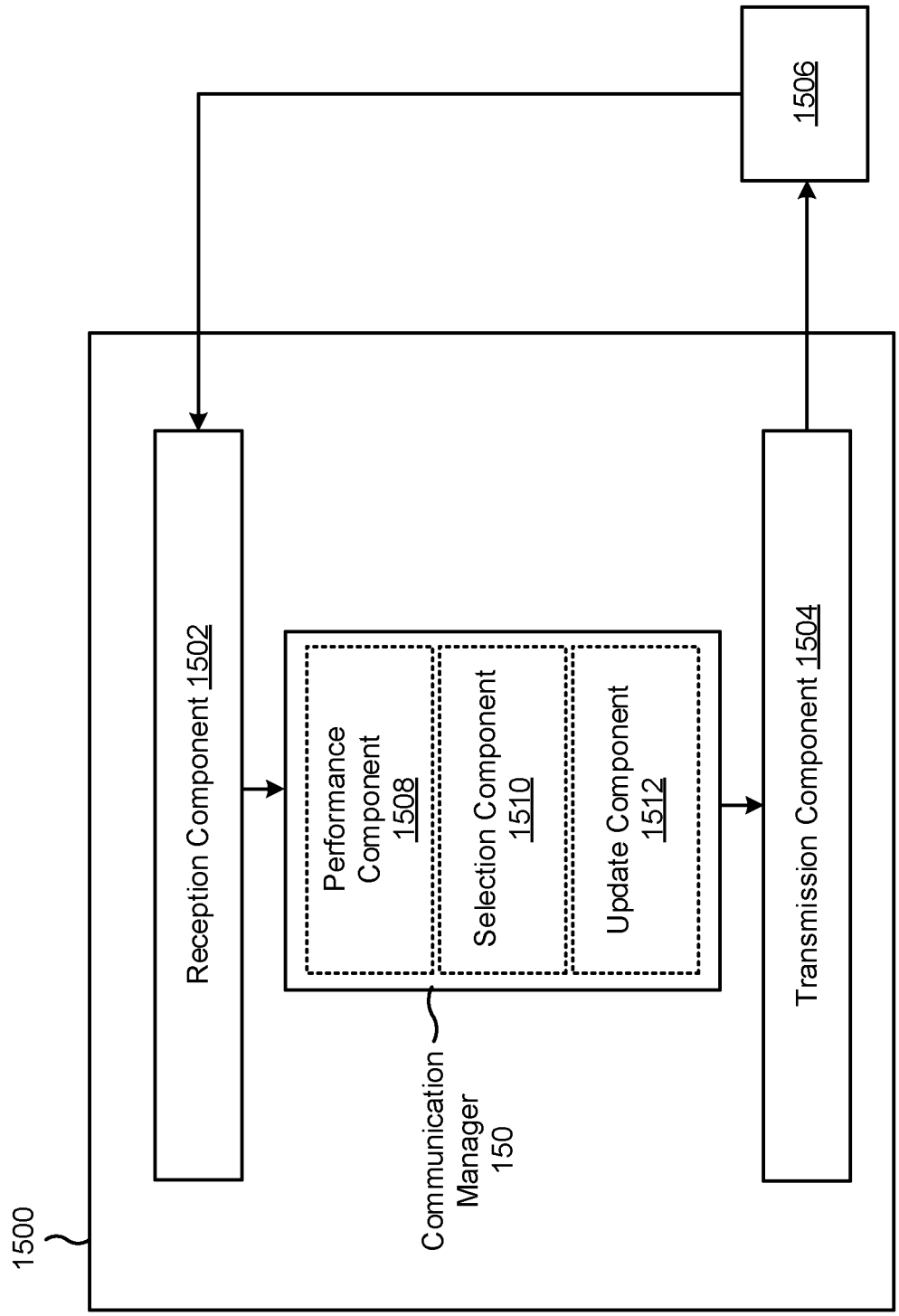
FIGS. 15 and 16 are block diagrams of example apparatuses for wireless communication, in accordance with the present disclosure.

FIG. 15 is a block diagram of an example apparatus 1500 for wireless communication. The apparatus 1500 may be a wireless node, or a wireless node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include one or more of a performance component 1508, a selection component 1510, or an update component 1512, among other examples.

In some aspects, the apparatus 1500 may be configured to perform one or more operations described herein in connection with FIGS. 8-12. Additionally, or alternatively, the apparatus 1500 may be configured to perform one or more processes described herein, such as process 1300 of FIG. 13, process 1400 of FIG. 14, or a combination thereof. In some aspects, the apparatus 1500 and/or one or more components shown in FIG. 15 may include one or more components of the wireless node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the wireless node described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the wireless node described in connection with FIG. 2. In some aspects, the transmission component 1504 may be co-located with the reception component 1502 in a transceiver.

The transmission component 1504 may transmit configuration information indicating a first PMI parameter and a second PMI parameter, wherein the first PMI parameter is associated with non-simultaneous activity of a DU and an MT, and wherein the second PMI parameter is associated with simultaneous activity of the DU and the MT. The performance component 1508 may perform a communication in accordance with a selected PMI parameter of the first PMI parameter and the second PMI parameter based at least in part on whether the DU and the MT are simultaneously active.

The selection component 1510 may select the selected PMI parameter based at least in part on a PMI subset restriction associated with a downlink transmission to the DU or on a PMI indication associated with the downlink transmission, wherein the selected PMI parameter is a TPMI precoder for an uplink transmission to the MT.

The transmission component 1504 may transmit signaling indicating whether to use the first TPMI precoder or the second TPMI precoder.

The reception component 1502 may receive, from an IAB node and prior to transmitting the configuration information, information indicating a TPMI codebook restriction, wherein the first TPMI precoder and the second TPMI precoder are in accordance with the TPMI codebook restriction, and wherein the MT and the DU are at the IAB node.

The transmission component 1504 may transmit signaling that indicates whether to use the first TPMI precoder or the second TPMI precoder.

The update component 1512 may update the bitmap based at least in part on transmitting a resource release.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
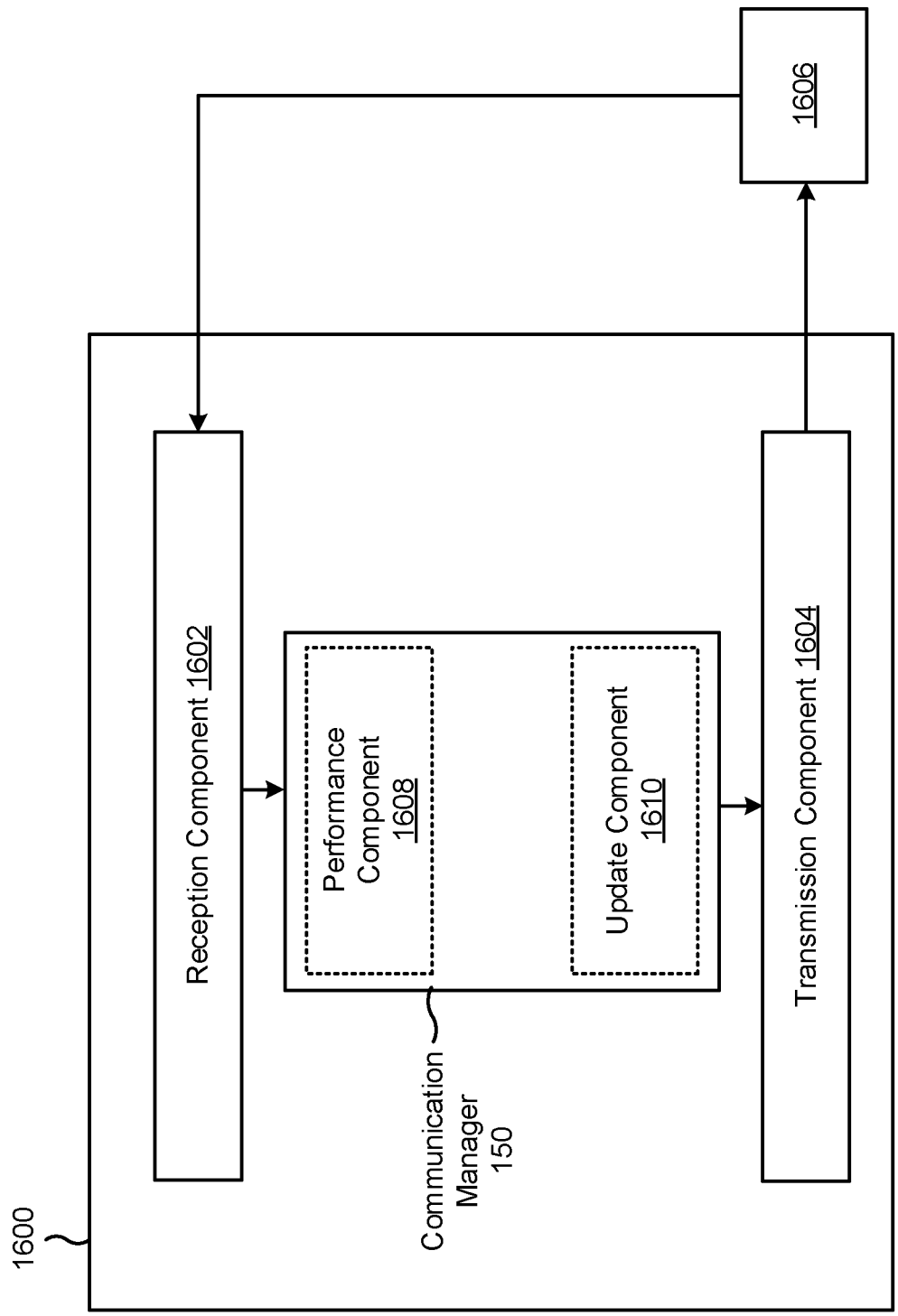

FIG. 16 is a block diagram of an example apparatus 1600 for wireless communication. The apparatus 1600 may be a IAB node, or a IAB node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include one or more of a performance component 1608 or an update component 1610, among other examples.

In some aspects, the apparatus 1600 may be configured to perform one or more operations described herein in connection with FIGS. 8-12. Additionally, or alternatively, the apparatus 1600 may be configured to perform one or more processes described herein, such as process 1300 of FIG. 13, process 1400 of FIG. 14, or a combination thereof. In some aspects, the apparatus 1600 and/or one or more components shown in FIG. 16 may include one or more components of the IAB node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the IAB node described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the IAB node described in connection with FIG. 2. In some aspects, the transmission component 1604 may be co-located with the reception component 1602 in a transceiver.

The reception component 1602 may receive configuration information indicating a first PMI parameter and a second PMI parameter, wherein the first PMI parameter is associated with non-simultaneous activity of a DU and an MT, and wherein the second PMI parameter is associated with simultaneous activity of the DU and the MT. The performance component 1608 may perform a communication in accordance with a selected PMI parameter of the first PMI parameter and the second PMI parameter based at least in part on whether the DU and the MT are simultaneously active.

The reception component 1602 may receive signaling indicating whether to use the first TPMI precoder or the second TPMI precoder.

The transmission component 1604 may transmit, prior to receiving the configuration information, information indicating a TPMI codebook restriction, wherein the first TPMI precoder and the second TPMI precoder satisfy the TPMI codebook restriction, and wherein the MT and the DU are at the IAB node.

The reception component 1602 may receive signaling that indicates whether to use the first TPMI precoder or the second TPMI precoder, wherein the configuration information is received from a parent IAB node of the IAB node, and wherein the DU and the MT are at the parent IAB node.

The update component 1610 may update the bitmap based at least in part on receiving a resource release.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a wireless node, comprising: transmitting configuration information indicating a first PMI parameter and a second PMI parameter, wherein the first PMI parameter is associated with non-simultaneous activity of a DU and an MT, and wherein the second PMI parameter is associated with simultaneous activity of the DU and the MT; and performing a communication in accordance with a selected PMI parameter of the first PMI parameter and the second PMI parameter based at least in part on whether the DU and the MT are simultaneously active.

Aspect 2: The method of Aspect 1, wherein the first PMI parameter is a first PMI subset restriction or a first TPMI precoder that allows one or more precoders that are associated with interference at one or more of the MT or the DU, and wherein the second PMI parameter is a second PMI subset restriction or a second TPMI precoder that disallows the one or more precoders that are associated with interference at one or more of the MT or the DU.

Aspect 3: The method of Aspect 2, wherein the interference is associated with a reception at the DU interfering with a reception at the MT, wherein the DU and the MT are at an integrated access and backhaul node configured by the wireless node.

Aspect 4: The method of Aspect 2, wherein performing the communication further comprises: receiving a PMI report using a PMI subset restriction of the selected PMI parameter; and communicating with a downstream node using a precoder indicated by the PMI report.

Aspect 5: The method of Aspect 2, wherein the interference is associated with a reception at the MT interfering with a reception at the DU, wherein the configuration information is transmitted to a child integrated access and backhaul node of the wireless node, and wherein the DU and the MT are at the wireless node.

Aspect 6: The method of Aspect 5, further comprising: selecting the selected PMI parameter based at least in part on a PMI subset restriction associated with a downlink transmission to the DU or on a PMI indication associated with the downlink transmission, wherein the selected PMI parameter is a TPMI precoder for an uplink transmission to the MT.

Aspect 7: The method of Aspect 2, further comprising: transmitting signaling indicating whether to use the first TPMI precoder or the second TPMI precoder.

Aspect 8: The method of Aspect 2, wherein the interference is associated with a transmission of the DU interfering with a reception at the MT, and wherein the DU and the MT are at the wireless node.

Aspect 9: The method of Aspect 8, wherein performing the communication further comprises: receiving a PMI report from a child integrated access and backhaul node, wherein the PMI report uses a PMI subset restriction of the selected PMI parameter.

Aspect 10: The method of Aspect 2, wherein the interference is caused by an uplink transmission of the MT interfering with an uplink reception at the DU.

Aspect 11: The method of Aspect 10, further comprising: receiving, from an IAB node and prior to transmitting the configuration information, information indicating a TPMI codebook restriction, wherein the first TPMI precoder and the second TPMI precoder are in accordance with the TPMI codebook restriction, and wherein the MT and the DU are at the IAB node.

Aspect 12: The method of Aspect 10, further comprising: transmitting signaling that indicates whether to use the first TPMI precoder or the second TPMI precoder.

Aspect 13: The method of one or more of Aspects 1 through 12, wherein the configuration information includes a bitmap indicating whether the second PMI parameter is active for a set of resources.

Aspect 14: The method of Aspect 13, wherein the set of resources is a set of time resources.

Aspect 15: The method of Aspect 13, wherein the set of resources is a set of frequency resources.

Aspect 16: The method of Aspect 13, further comprising: updating the bitmap based at least in part on transmitting a resource release.

Aspect 17: The method of one or more of Aspects 1 through 16, wherein the selected PMI parameter is selected based at least in part on a frequency configuration of resources configured for the wireless node.

Aspect 18: The method of one or more of Aspects 1 through 17, wherein the configuration information indicates three or more PMI parameters associated with different frequency configurations of resources configured for the wireless node.

Aspect 19: The method of one or more of Aspects 1 through 18, wherein the selected PMI parameter is the second PMI parameter, wherein the wireless node is associated with simultaneous interference at the MT and the DU, and wherein the selected PMI parameter is selected based at least in part on respective priorities associated with communications of the MT and the DU.

Aspect 20: The method of one or more of Aspects 1 through 19, wherein the selected PMI parameter is the second PMI parameter, wherein the wireless node is associated with simultaneous interference at the MT and the DU, and wherein the selected PMI parameter is selected based at least in part on respective link types of links associated with the MT and the DU.

Aspect 21: The method of one or more of Aspects 1 through 20, wherein the wireless node is associated with simultaneous interference at the MT and the DU, wherein the selected PMI parameter indicates a PMI codebook for the DU and a TPMI precoder for the MT, and wherein the PMI codebook and the TPMI precoder are selected based at least in part on cross-link interference between a link associated with the DU and a link associated with the MT.

Aspect 22: The method of Aspect 21, wherein the selected PMI parameter is selected based at least in part on a resource sharing pattern between the wireless node and an integrated access and backhaul node.

Aspect 23: The method of Aspect 22, wherein the resource sharing pattern is mapped to a sequence of pairs of PMI codebooks and TPMI precoders.

Aspect 24: A method of wireless communication performed by an IAB node, comprising: receiving configuration information indicating a first PMI parameter and a second PMI parameter, wherein the first PMI parameter is associated with non-simultaneous activity of a DU and an MT, and wherein the second PMI parameter is associated with simultaneous activity of the DU and the MT; and performing a communication in accordance with a selected PMI parameter of the first PMI parameter and the second PMI parameter based at least in part on whether the DU and the MT are simultaneously active.

Aspect 25: The method of Aspect 24, wherein the first PMI parameter is a first PMI subset restriction or a first TPMI precoder that allows one or more precoders that are associated with interference at one or more of the MT or the DU, and wherein the second PMI parameter is a second PMI subset restriction or a second TPMI precoder that disallows the one or more precoders that are associated with interference at one or more of the MT or the DU.

Aspect 26: The method of Aspect 25, wherein the interference is associated with a reception at the DU interfering with a reception at the MT, wherein the DU and the MT are at the IAB node.

Aspect 27: The method of Aspect 25, wherein performing the communication further comprises: transmitting a PMI report using a PMI subset restriction of the selected PMI parameter.

Aspect 28: The method of Aspect 25, wherein the interference is associated with a reception at the MT interfering with a reception at the DU, wherein the configuration information is received from a parent IAB node of the IAB node, and wherein the DU and the MT are at the parent IAB node.

Aspect 29: The method of Aspect 25, further comprising: receiving signaling indicating whether to use the first TPMI precoder or the second TPMI precoder.

Aspect 30: The method of Aspect 25, wherein the interference is associated with a transmission of the DU interfering with a reception at the MT, wherein the configuration information is received from a parent IAB node of the IAB node, and wherein the DU and the MT are at the parent IAB node.

Aspect 31: The method of Aspect 30, wherein performing the communication further comprises: transmitting a PMI report to the parent IAB node using a PMI subset restriction of the selected PMI parameter.

Aspect 32: The method of Aspect 25, wherein the interference is caused by an uplink transmission of the MT interfering with an uplink reception at the DU.

Aspect 33: The method of Aspect 32, further comprising: transmitting, prior to receiving the configuration information, information indicating a TPMI codebook restriction, wherein the first TPMI precoder and the second TPMI precoder satisfy the TPMI codebook restriction, and wherein the MT and the DU are at the IAB node.

Aspect 34: The method of Aspect 32, further comprising: receiving signaling that indicates whether to use the first TPMI precoder or the second TPMI precoder, wherein the configuration information is received from a parent IAB node of the IAB node, and wherein the DU and the MT are at the parent IAB node.

Aspect 35: The method of one or more of Aspects 24 through 34, wherein the configuration information includes a bitmap indicating whether the second PMI parameter is active for a set of resources.

Aspect 36: The method of Aspect 35, wherein the set of resources is a set of time resources.

Aspect 37: The method of Aspect 35, wherein the set of resources is a set of frequency resources.

Aspect 38: The method of Aspect 35, further comprising: updating the bitmap based at least in part on receiving a resource release.

Aspect 39: The method of one or more of Aspects 24 through 38, wherein the selected PMI parameter is selected based at least in part on a frequency configuration of resources configured for the IAB node.

Aspect 40: The method of one or more of Aspects 24 through 39, wherein the configuration information indicates three or more PMI parameters associated with different frequency configurations of resources configured for the IAB node.

Aspect 41: The method of one or more of Aspects 24 through 40, wherein the selected PMI parameter is the second PMI parameter, and wherein the second PMI parameter is selected based at least in part on a priority associated with the communication.

Aspect 42: The method of one or more of Aspects 24 through 41, wherein the selected PMI parameter is the second PMI parameter, and wherein the second PMI parameter is selected based at least in part on a type of link on which the communication is performed.

Aspect 43: The method of one or more of Aspects 24 through 42, wherein the selected PMI parameter is selected based at least in part on cross-link interference between a link associated with the DU and a link associated with the MT.

Aspect 44: The method of Aspect 43, wherein the selected PMI parameter is selected based at least in part on a resource sharing pattern between the IAB node and another IAB node.

Aspect 45: The method of Aspect 44, wherein the resource sharing pattern is mapped to information indicating the selected PMI parameter.

Aspect 46: An apparatus for wireless communication at a device, comprising a processor; memory coupled with the processor; and instructions stored in the memory and executable by the processor to cause the apparatus to perform the method of one or more of Aspects 1 through 23.

Aspect 47: A device for wireless communication, comprising a memory and one or more processors coupled to the memory, the one or more processors configured to perform the method of one or more of 1 through 23.

Aspect 48: An apparatus for wireless communication, comprising at least one means for performing the method of one or more of 1 through 23.

Aspect 49: A non-transitory computer-readable medium storing code for wireless communication, the code comprising instructions executable by a processor to perform the method of one or more of 1 through 23.

Aspect 50: A non-transitory computer-readable medium storing a set of instructions for wireless communication, the set of instructions comprising one or more instructions that, when executed by one or more processors of a device, cause the device to perform the method of one or more of Aspects 1 through 23.

Aspect 51: An apparatus for wireless communication at a device, comprising a processor; memory coupled with the processor; and instructions stored in the memory and executable by the processor to cause the apparatus to perform the method of one or more of Aspects 24 through 45.

Aspect 52: A device for wireless communication, comprising a memory and one or more processors coupled to the memory, the one or more processors configured to perform the method of one or more of 24 through 45.

Aspect 53: An apparatus for wireless communication, comprising at least one means for performing the method of one or more of 24 through 45.

Aspect 54: A non-transitory computer-readable medium storing code for wireless communication, the code comprising instructions executable by a processor to perform the method of one or more of 24 through 45.

Aspect 55: A non-transitory computer-readable medium storing a set of instructions for wireless communication, the set of instructions comprising one or more instructions that, when executed by one or more processors of a device, cause the device to perform the method of one or more of Aspects 24 through 45.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a wireless node, comprising:
   one or more memories; and
   one or more processors, coupled to the one or more memories, the one or more processors individually or collectively configured to:
   transmit configuration information indicating a first precoding matrix indicator (PMI) parameter and a second PMI parameter,
      wherein the first PMI parameter is associated with non-simultaneous activity of a distributed unit (DU) and a mobile termination (MT), and
      wherein the second PMI parameter is configured to mitigate interference associated with simultaneous activity of the DU and the MT; and
   perform a communication in accordance with a selected PMI parameter of the first PMI parameter and the second PMI parameter based at least in part on whether the DU and the MT are simultaneously active.

2. The apparatus of claim 1, wherein the first PMI parameter is a first PMI subset restriction or a first transmit PMI (TPMI) precoder that allows one or more precoders that are associated with interference at one or more of the MT or the DU, and
   wherein the second PMI parameter is a second PMI subset restriction or a second TPMI precoder that disallows the one or more precoders that are associated with interference at one or more of the MT or the DU.

3. The apparatus of claim 2, wherein the interference is associated with a reception at the MT interfering with a reception at the DU, wherein the DU and the MT are at an integrated access and backhaul (IAB) node configured by the wireless node.

4. The apparatus of claim 2, wherein the one or more processors, to perform the communication, are configured to:
receive a PMI report using a PMI subset restriction of the selected PMI parameter; and
communicate with a downstream node using a precoder indicated by the PMI report.

5. The apparatus of claim 2, wherein the interference is associated with a reception at the DU interfering with a reception at the MT, wherein the configuration information is transmitted to a child integrated access and backhaul node of the wireless node, and wherein the DU and the MT are at the wireless node.

6. The apparatus of claim 2, wherein the one or more processors are further configured to:
transmit signaling indicating whether to use the first TPMI precoder or the second TPMI precoder.

7. The apparatus of claim 2, wherein the interference is associated with a transmission of the DU interfering with a reception at the MT, and wherein the DU and the MT are at the wireless node.

8. The apparatus of claim 2, wherein the interference is caused by an uplink transmission of the MT interfering with an uplink reception at the DU.

9. The apparatus of claim 1, wherein the configuration information includes a bitmap indicating whether the second PMI parameter is active for a set of resources, wherein the set of resources is at least one of a set of time resources or a set of frequency resources.

10. The apparatus of claim 1, wherein the selected PMI parameter is selected based at least in part on a frequency configuration of resources configured for the wireless node.

11. The apparatus of claim 1, wherein the configuration information indicates three or more PMI parameters associated with different frequency configurations of resources configured for the wireless node.

12. The apparatus of claim 1, wherein the selected PMI parameter is the second PMI parameter, wherein the wireless node is associated with simultaneous interference at the MT and the DU, and wherein the selected PMI parameter is selected based at least in part on respective priorities associated with communications of the MT and the DU.

13. The apparatus of claim 1, wherein the selected PMI parameter is the second PMI parameter, wherein the wireless node is associated with simultaneous interference at the MT and the DU, and wherein the selected PMI parameter is selected based at least in part on respective link types of links associated with the MT and the DU.

14. The apparatus of claim 1, wherein the wireless node is associated with simultaneous interference at the MT and the DU, wherein the selected PMI parameter indicates a PMI codebook for the DU and a TPMI precoder for the MT, and wherein the PMI codebook and the TPMI precoder are selected based at least in part on cross-link interference between a link associated with the DU and a link associated with the MT.

15. An apparatus for wireless communication at an integrated access and backhaul (IAB) node, comprising:
one or more memories; and
one or more processors, coupled to the one or more memories, the one or more processors individually or collectively configured to:
receive configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter is configured to mitigate interference associated with simultaneous activity of the DU and the MT; and
perform a communication in accordance with a selected PMI parameter of the first PMI parameter and the second PMI parameter based at least in part on whether the DU and the MT are simultaneously active.

16. The apparatus of claim 15, wherein the selected PMI parameter is selected based at least in part on a resource sharing pattern between the apparatus and a wireless node.

17. The apparatus of claim 16, wherein the resource sharing pattern is mapped to a sequence of pairs of PMI codebooks and TPMI precoders.

18. The apparatus of claim 17, wherein the first PMI parameter is a first PMI subset restriction or a first transmit PMI (TPMI) precoder that allows one or more precoders that are associated with interference at one or more of the MT or the DU, and wherein the second PMI parameter is a second PMI subset restriction or a second TPMI precoder that disallows the one or more precoders that are associated with the interference at the one or more of the MT or the DU.

19. The apparatus of claim 15, wherein the configuration information includes a bitmap indicating whether the second PMI parameter is active for a set of resources, wherein the set of resources is at least one of a set of time resources or a set of frequency resources.

20. The apparatus of claim 15, wherein the selected PMI parameter is selected based at least in part on a frequency configuration of resources configured for the IAB node.

21. The apparatus of claim 15, wherein the configuration information indicates three or more PMI parameters associated with different frequency configurations of resources configured for the IAB node.

22. A method of wireless communication performed by a wireless node, comprising:
transmitting configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter configured to mitigate interference is associated with simultaneous activity of the DU and the MT; and
performing a communication in accordance with a selected PMI parameter of the first PMI parameter and the second PMI parameter based at least in part on whether the DU and the MT are simultaneously active.

23. The method of claim 22, wherein the first PMI parameter is a first PMI subset restriction or a first transmit PMI (TPMI) precoder that allows one or more precoders that are associated with interference at one or more of the MT or the DU, and wherein the second PMI parameter is a second PMI subset restriction or a second TPMI precoder that disallows the one or more precoders that are associated with interference at one or more of the MT or the DU.

24. The method of claim 23, wherein the interference is associated with a reception at the MT interfering with a reception at the DU, wherein the DU and the MT are at an integrated access and backhaul (IAB) node configured by the wireless node.

25. The method of claim 23, wherein performing the communication further comprises:

receiving a PMI report using a PMI subset restriction of the selected PMI parameter; and communicating with a downstream node using a precoder indicated by the PMI report.

26. The method of claim 23, wherein the interference is associated with a reception at the DU interfering with a reception at the MT, wherein the configuration information is transmitted to a child integrated access and backhaul node of the wireless node, and wherein the DU and the MT are at the wireless node.

27. A method of wireless communication performed by an integrated access and backhaul (IAB) node, comprising:

receiving configuration information indicating a first precoding matrix indicator (PMI) parameter and a second PMI parameter, wherein the first PMI parameter is associated with non-simultaneous activity of a distributed unit (DU) and a mobile termination (MT), and wherein the second PMI parameter configured to mitigate interference is associated with simultaneous activity of the DU and the MT; and performing a communication in accordance with a selected PMI parameter of the first PMI parameter and the second PMI parameter based at least in part on whether the DU and the MT are simultaneously active.

28. The method of claim 27, wherein the first PMI parameter is a first PMI subset restriction or a first transmit PMI (TPMI) precoder that allows one or more precoders that are associated with interference at one or more of the MT or the DU, and wherein the second PMI parameter is a second PMI subset restriction or a second TPMI precoder that disallows the one or more precoders that are associated with interference at one or more of the MT or the DU.

29. The method of claim 28, wherein the interference is associated with a reception at the MT interfering with a reception at the DU, wherein the DU and the MT are at the IAB node.

30. The method of claim 28, wherein performing the communication further comprises:

transmitting a PMI report using a PMI subset restriction of the selected PMI parameter.

\* \* \* \* \*